(12) United States Patent
O'Leary et al.

(10) Patent No.: US 10,871,028 B2
(45) Date of Patent: Dec. 22, 2020

(54) PORTABLE WINDOW INSERT FOR UTILITY DISTRIBUTION

(71) Applicants: Ryan O'Leary, Florida, NY (US); Robert Knebel, Florida, NY (US)

(72) Inventors: Ryan O'Leary, Florida, NY (US); Robert Knebel, Florida, NY (US)

(73) Assignee: Power Pane, Inc., Florida, NY (US)

( * ) Notice: Subject to any disclaimer, the term of this patent is extended or adjusted under 35 U.S.C. 154(b) by 0 days.

(21) Appl. No.: 16/874,419

(22) Filed: May 14, 2020

(65) Prior Publication Data

US 2020/0277820 A1 Sep. 3, 2020

Related U.S. Application Data

(62) Division of application No. 15/726,327, filed on Oct. 5, 2017, now Pat. No. 10,689,901.

(51) Int. Cl.
*E06B 7/32* (2006.01)
*H02G 3/16* (2006.01)
(Continued)

(52) U.S. Cl.
CPC ............... *E06B 7/32* (2013.01); *H02G 3/083* (2013.01); *H02G 3/16* (2013.01); *E06B 7/03* (2013.01); *H02G 3/12* (2013.01); *H02G 3/22* (2013.01)

(58) Field of Classification Search
CPC ..... E06B 7/30; E06B 7/32; E06B 7/03; E06B 7/06; F16L 5/00; H02G 3/22; H02G 3/083; H02G 3/16; H02G 3/12
See application file for complete search history.

(56) References Cited

U.S. PATENT DOCUMENTS 1,769,264 A 7/1930 Kohlmeier
2,137,924 A * 11/1938 Schickedanz ............. E06B 7/03
454/222

(Continued)

*Primary Examiner* — Johnnie A. Shablack
(74) *Attorney, Agent, or Firm* — Michael E. Zall

(57) ABSTRACT

Several embodiments of a portable window insert for the temporary distribution of utilities, e.g., heat, air-conditioning, electricity, internet cables, water, and telephone cables through a window opening are described. All the devices are foldable for ease of portability and can be expanded to be secured in the window opening while minimizing air leakage through the window. In one embodiment a main panel has a pass-through opening through the panel for the utility lines, a handhold opening and a slider panel slidably engaged with the main panel. A flexible sealing member surrounds the pass through opening. A sealing panel is slidably mounted to the rear face of the main panel that may be selectively positioned to cover the pass-through opening or to uncover the pass-through opening. When the slider panel is in a retracted position the pass-through opening is covered by the slider panel and the hand hold is exposed for use and ease of portability. When the slider panel is in the extended position the edges of the main panel and slider panel abut the sides of the window opening to secure the portable window insert in the window opening and to expose the pass-through opening for use. The sealing panel may be selectively positioned to cover the pass-through opening to inhibit the passage of air and utility lines there through or to uncover the pass-through opening to permit the passage of utility lines there through.

6 Claims, 40 Drawing Sheets

(51) Int. Cl.
*H02G 3/08* (2006.01)
*H02G 3/12* (2006.01)
*H02G 3/22* (2006.01)
*E06B 7/03* (2006.01)

(56) References Cited

U.S. PATENT DOCUMENTS

| | | | |
|---|---|---|---|
| 2,561,928 A | 7/1951 | Johnston | |
| 3,567,112 A * | 3/1971 | Wittekind | A47G 29/1245 232/1 R |
| 4,081,915 A * | 4/1978 | Materniak nee Babcerowicz | D06F 58/20 285/9.1 |
| 4,267,618 A * | 5/1981 | Cuscovitch | A47L 11/34 15/246.2 |
| 4,334,461 A * | 6/1982 | Ferguson | F24F 7/00 285/189 |
| 5,135,413 A | 8/1992 | Pannizzo | |
| 5,501,041 A * | 3/1996 | Fischbeck | E06B 7/03 49/55 |
| 5,735,079 A | 4/1998 | Davlantes | |
| 6,369,321 B1 | 4/2002 | Flegel | |
| 7,105,057 B1 | 9/2006 | Colussi | |
| D546,761 S | 7/2007 | Schnackenberg | |
| 7,271,346 B1 | 9/2007 | Ettinger | |
| 7,471,505 B2 | 12/2008 | Gull | |
| 7,614,363 B2 | 11/2009 | Di Angelo | |
| 7,804,032 B2 | 9/2010 | Wilker | |
| 7,909,642 B1 | 3/2011 | Czarnecki | |
| 8,138,430 B1 | 3/2012 | Ucerou | |
| 8,159,084 B2 | 4/2012 | Gilpatrick | |
| 8,469,748 B2 | 6/2013 | Chambers | |
| 8,604,343 B2 | 12/2013 | Nixon-Lane | |
| 10,006,242 B2 * | 6/2018 | Anderson | E06B 7/32 |
| 10,224,680 B2 * | 3/2019 | Garcia | E06B 7/28 |
| 10,689,901 B2 * | 6/2020 | O'Leary | E06B 7/32 |
| 2008/0134584 A1* | 6/2008 | McGhee | E06B 7/32 49/484.1 |
| 2020/0277820 A1* | 9/2020 | O'Leary | E06B 7/32 |

* cited by examiner

PORTABLE WINDOW INSERT FOR UTILITY DISTRIBUTION

RELATED APPLICATIONS

This application is a Divisional Application of U.S. Ser. No. 15/726,327 filed on Oct. 5, 2017, now U.S. Pat. No. 10,689,901, the entire disclosure of which is incorporated herein by reference.

SPECIFICATION

Field of the Invention

This invention relates to a portable window insert for distributing utilities through a window. In particular, this invention relates to portable window insert that can be adjusted to fit into the window and distribute utilities, e.g., electricity, from one side of the window to the other side of the window. The invention is particularly useful in the construction industry when utilities have to be transferred through a window for either the comfort of the construction workers or to provide utilities for use in the construction project.

Background of the Invention

It often necessary to transfer utilities, e.g., air-conditioning, heat, electricity, etc., from the exterior of a room to the interior of the room or vice versa. For example, during renovation of a room when there is no heat or air conditioning in the room, such utilities can be transferred from an outside generator into the room to permit the construction workers to work in comfort. Often, it may be necessary to bring electricity into the interior construction area through a portable generator located exterior to the room. This has been done by putting cables through an open window. Such a system of bringing utilities into the construction area is inefficient, particularly if the room is heated or air conditioned, and may be dangerous due to loose wires passing over the window transom, insects coming through the open window, loss of heat in the winter, loss of air conditioning during the summer, etc. Closing the window may damage the extension cord and may create a shock hazard.

The following references may be relevant to this invention:
  U.S. Pat. No. D546,761 to Schnackenberg.
  U.S. Pat. No. 2,561,928 to Johnston.
  U.S. Pat. No. 5,135,413 to Pannizzo.
  U.S. Pat. No. 6,369,321 to Flegel.
  U.S. Pat. No. 7,271,346 to Ettinger.
  U.S. Pat. No. 7,471,505 to Gull.
  U.S. Pat. No. 7,614,363 to Di Angelo.
  U.S. Pat. No. 7,804,032 to Wilker.
  U.S. Pat. No. 7,909,642 to Czarneckki.
  U.S. Pat. No. 8,138,430 to Ucerou.
  U.S. Pat. No. 8,159,084 to Gilpatrick.
  U.S. Pat. No. 8,469,748 to Chambers.
  U.S. Pat. No. 8,604,343 to Nixon-Lane.

OBJECTS AND SUMMARY OF THE INVENTION

It is an object of this invention to provide a portable window insert for the temporary distribution of utility lines through a window opening, the insert being adjustable to the size of the window, and capable of transmitting utilities lines there through and being easily transported to a job site.

It is a further object of this invention to provide an insert for a window that is adjustable to the size of the window and can transmit there through various utilities, such as heat, air-conditioning, ventilation, compressed air and gases, electricity, internet cables, water, and telephone cables.

It is yet another object of the present invention to provide an insert for a window for transmitting utilities there through that can be easily opened and installed in the window and after use can be easily removed from the window and folded up into an easy to carry device.

It is a further object of this invention to provide a device which permits the passage of utilities through an open window into a building while providing a weather proof seal for the opening and preventing the entry of carbon monoxide and other fumes into the building.

It is yet another object of this invention is to provide a device which permits the passage of utilities through a window, e.g., electricity, and that prevents the entry of insects and/or small animals into the building thereby preventing the introduction of diseases and other health issues.

It is yet another object of this invention is to provide a device which permits the passage of utilities through a window that prevents damage to the utility conduits, e.g., wires, tubes, etc. by not permitting the window to close directly onto the utility conduits.

The first embodiment of the portable window insert of this invention comprises a main panel having a front face, a rear face, an upper edge, an opposed lower edge, a first side edge and an opposed second side edge. A pass-through opening is provided through in the main panel through which the utility lines can pass. The main panel also includes a handhold opening proximate the first edge. A slider panel, having an upper edge, an opposed lower edge, a first side edge and an opposed second side edge, is provided wherein the upper and lower edges of the main panel and the slider edges are slidably engaged with each other on the front face of the main panel. The slider panel may be selectively positioned to a retracted position or to an extended position.

A flexible sealing member is mounted to the rear face of the main panel surrounding the pass through opening. The sealing member permits the passage of the utility lines through the pass-through opening and substantially surrounds such lines to inhibit the passage of air through the pass through opening. Optionally, a sealing panel is slidably mounted to the rear face of the main panel that can be selectively positioned to cover the pass-through opening or to expose the pass-through opening.

When the slider panel is in the retracted position the second edge of the slider panel is aligned with the second edge of the main panel, the pass-through opening is covered by the slider panel and the hand hold is exposed for use permitting a user to carry the portable window insert by grasping the hand hold opening.

In use the main panel lower edge is positioned to rest on the bottom sill, the slider panel is in the extended position with the second edge of the main panel abutting one of the sides of the window opening and the first edge of the slider panel abutting the other side of the window opening, whereby the portable window insert is securely lodged in the window opening and the pass-through opening is exposed for use. The sealing panel may be selectively positioned to cover the pass-through opening to inhibit the passage of air and utility lines there through or to expose or uncover the pass-through opening to permit the passage of utility lines there through.

The second embodiment of the portable window insert of this invention provides for the temporary distribution of electricity or electrical signals through a window opening. The insert comprises a main panel having a front face, a rear face, an upper edge, an opposed lower edge, a first side edge and an opposed second side edge, and a handhold opening proximate the first edge. An electrical signal receptacle e.g., electrical receptacle, is mounted on the front face of the main panel proximate the second side edge of the main panel.

A slider panel is provided having an upper edge, an opposed lower edge, a first side edge and an opposed second side edge. The upper and lower edges of the main panel and the slider edges are slidably engaged with each other on the front face of the main panel. The slider panel may be selectively positioned to a retracted position or to an extended position.

A cable projects through the rear face of the main panel, one end of the cable in electrical communication with the electrical receptacle and the other end having an electrical plug. A cable storage compartment is located on the rear face of the main panel for removably storing the cable and plug therein.

When the slider panel is in the retracted position the second edge of the slider panel abuts the electrical receptacle mounted on the front face of the main panel and the hand hold is not covered or exposed by the slider panel permitting a user to carry the portable window insert by grasping the hand hold opening.

In use the main panel lower edge is positioned to rest on the bottom sill, the slider panel is in the extended position with the second edge of the main panel abutting one of the sides of the window opening and the first edge of the slider panel abuts the other side of the window opening to secure the portable window insert in the window opening.

The third embodiment of the portable window insert of this invention provides for the temporary distribution of electricity through a window opening. The insert comprises a main body having a front face, a rear face, an upper face, an opposed lower face, a right side face and an opposed left side face. There is at least one electrical receptacle, preferably two, mounted on the front face of the main body. An internal electrical receptacle is mounted on the rear face of the main body and is in electrical communication with the electrical receptacles mounted on the front face of the main body.

A right wing member and a left wing member are provided, each having a front face, a rear face, an upper face, an opposed lower face, a right side face and an opposed left side face. The right side face of the left wing member is hingedly mounted to the left side face of the main body and the left side face of the right wing member is hingedly mounted to the right side face of the main body. Each wing member can be selectively pivoted to i) a closed position wherein the rear face of each wing member overlays the rear face of the main body, or ii) an open position wherein the rear face of each wing member body is coplanar with the rear face of the main body.

A right slider panel is provided having a right side edge and an opposed left side edge slidably engaged with the right wing member, wherein the slider panel may be selectively positioned to i) an extended position wherein the right slider panel extends from the right side face of the right wing member, or ii) a retracted position wherein the right edge of the right slider panel is flush with the right side edge of the right wing member.

A left slider panel is provided having a right side edge and an opposed left side edge slidably engaged with the left wing member, wherein the slider panel may be selectively positioned to i) an extended position wherein the left slider panel extends from the left side face of the left wing member, or ii) a retracted position wherein the left edge of the left slider panel is flush with the left side edge of the right wing member;

In use the lower face of the main body is positioned to rest on the bottom sill of the window, the right and left wing members are in the open position and the right edge of the right slider panel is in the extended position abutting one side of the window opening and the left edge of the left slider panel is in the extended position abutting the other side of the window opening, thus securing the portable window insert in the window opening. When the portable window insert is not in use in the window opening, the right and left slider panels are in the retracted position and the right and left wing members are in the closed position, preferably held in place by magnetic latches.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

Further aspects, features and advantages of the present invention will become even more apparent with reference to the following detailed description and the accompanying drawings.

First Embodiment

FIG. 3—A front perspective view of the portable window insert 100 depicted in FIGS. 1-2 fully installed in the window with utility tubes and cables 116, 118, 120 passing there through.

FIG. 4—A rear perspective view of the portable window insert 100 depicted in FIG. 1-3 fully installed in the window with utility tubes and cables 116, 118, 120 passing there through.

Second Embodiment

Figure 13:
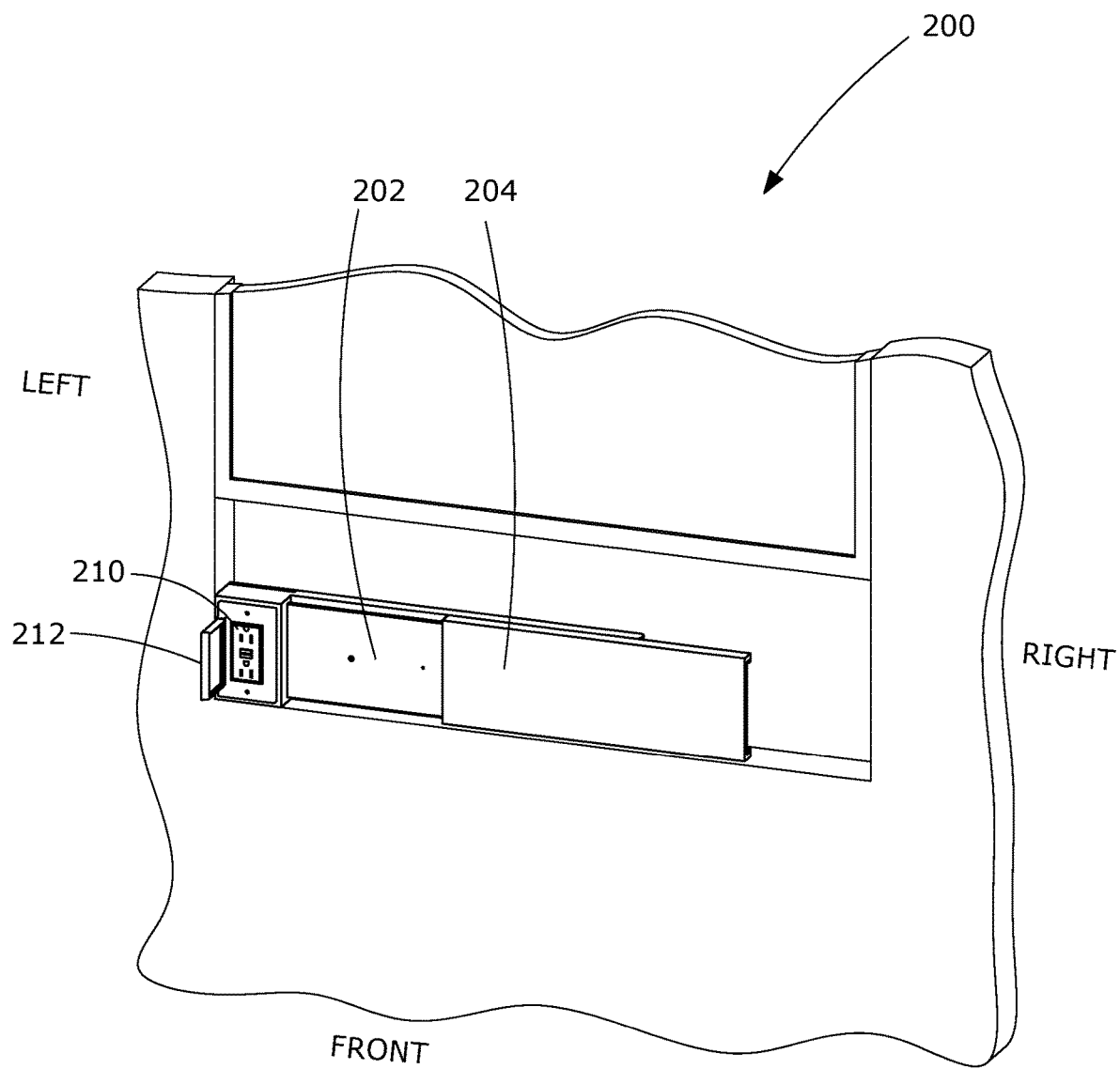

FIG. 13—A front perspective view of another embodiment of the portable window insert 200 placed in a partially opened window with the slider 204 partially extended.

Figure 14:
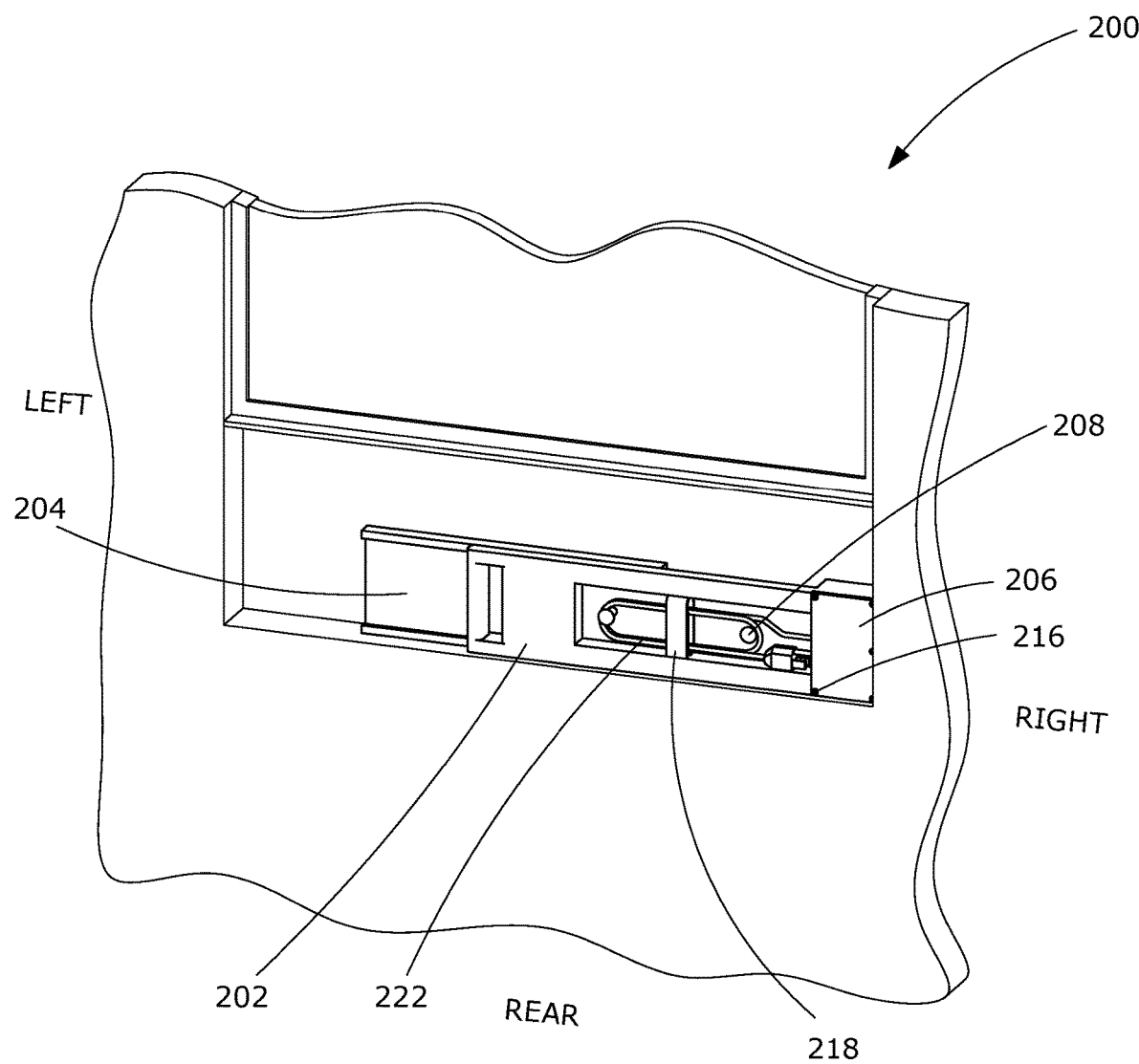

FIG. 14—The rear perspective view of the embodiment of the portable window insert 200 depicted in FIG. 13 in the partially opened window with the slider 204 partially extended.

Figure 15:
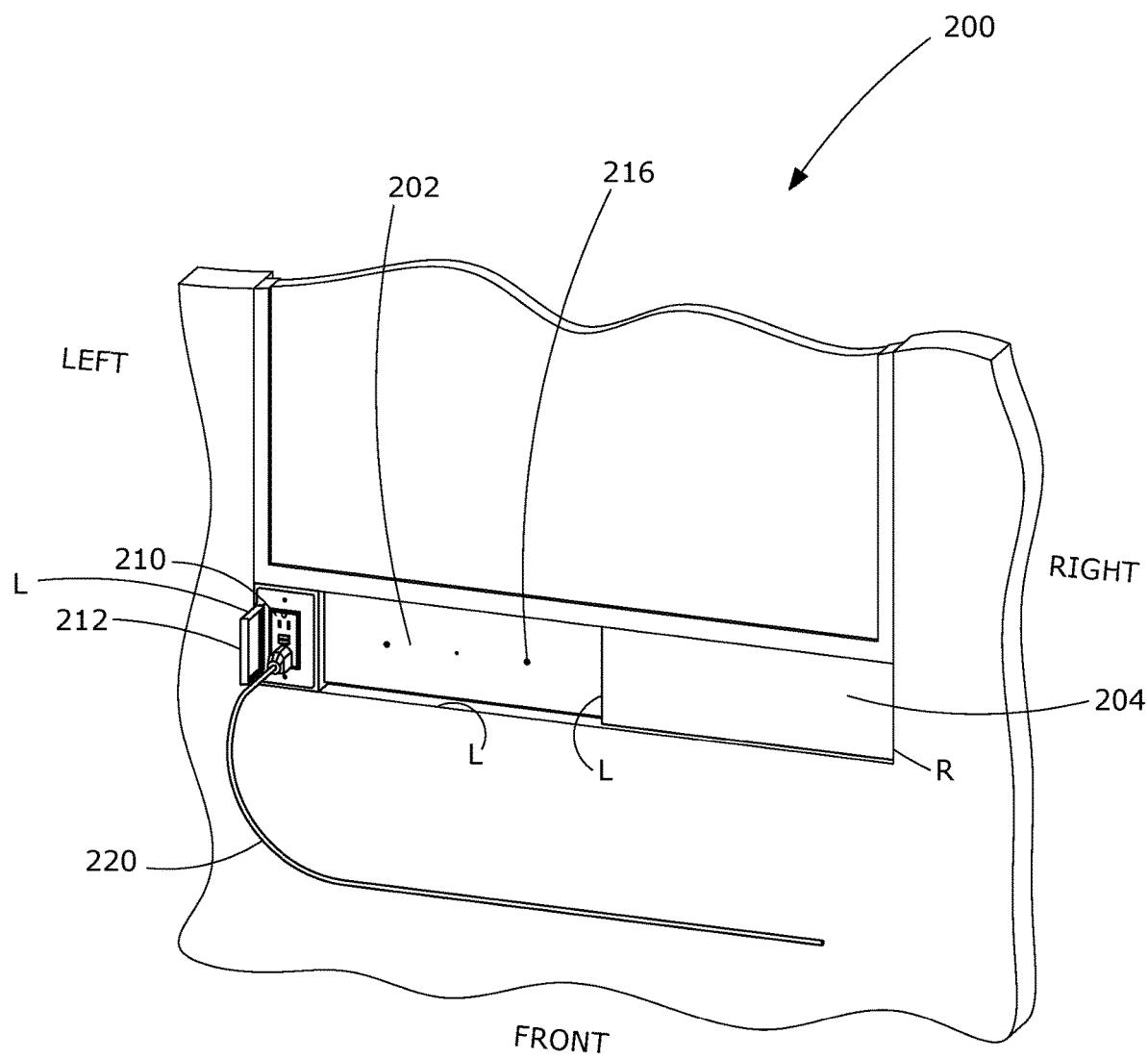

FIG. 15—A front perspective view of the portable window 200 insert depicted in FIGS. 13-14 fully installed in the window with an electrical cable 220 plugged into a receptacle 210 mounted therein.

Figure 16:
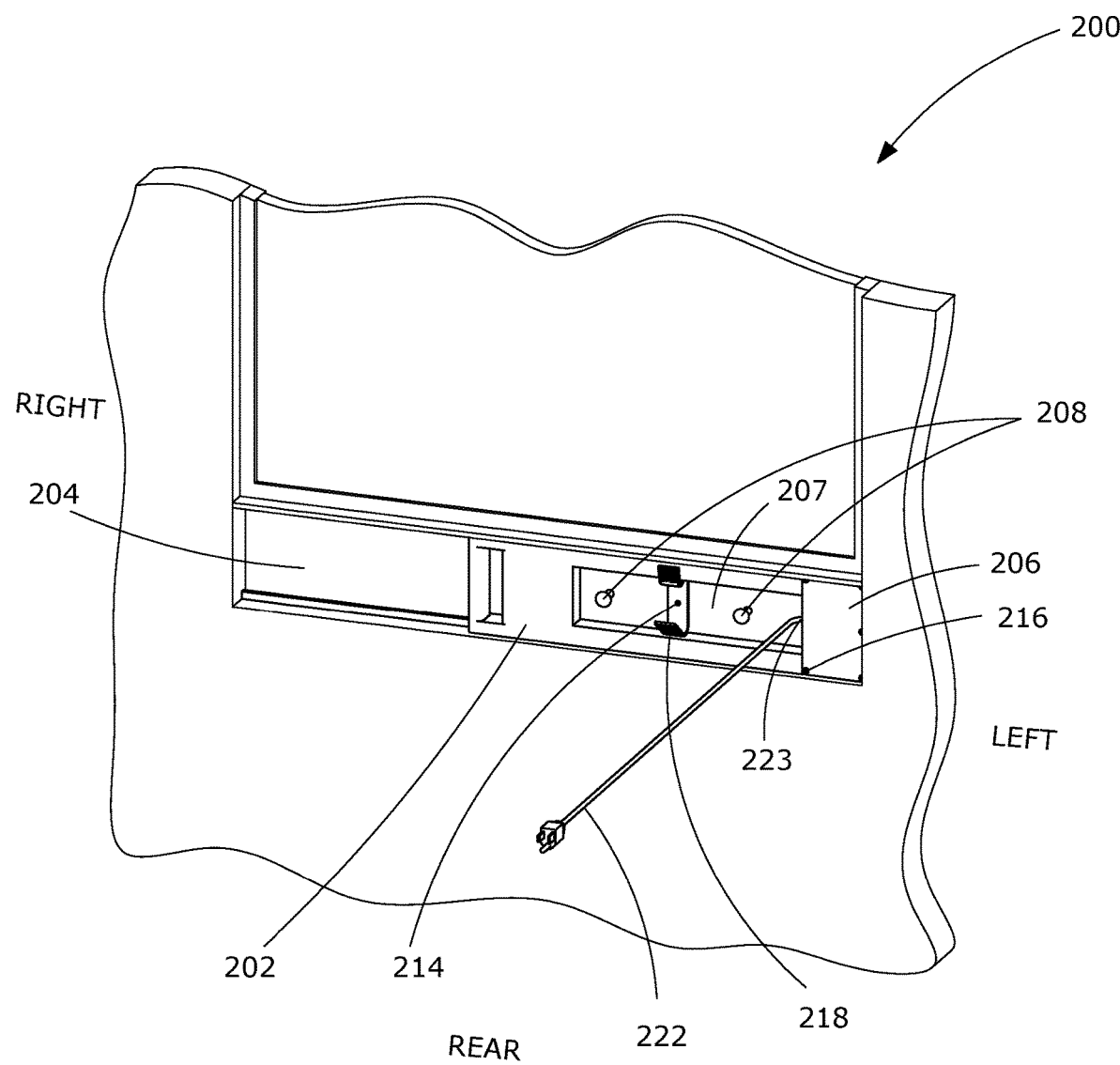

FIG. 16—A rear perspective view of the portable window insert 200 depicted in FIGS. 13-15 fully installed in the window and extending therefrom is an electrical cable 220 and plug 222 that are in electrical communication with the receptacle 210 depicted in FIG. 16.

Figure 17:
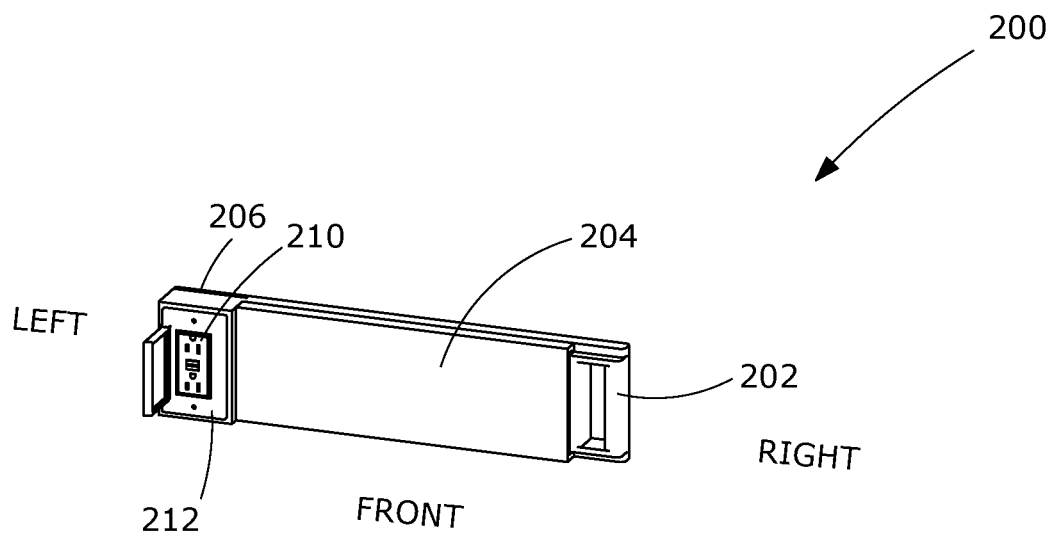

FIG. 17—A front perspective view of the portable window insert 200 depicted in FIGS. 13-16 collapsed for easy transport by the user.

Figure 18:
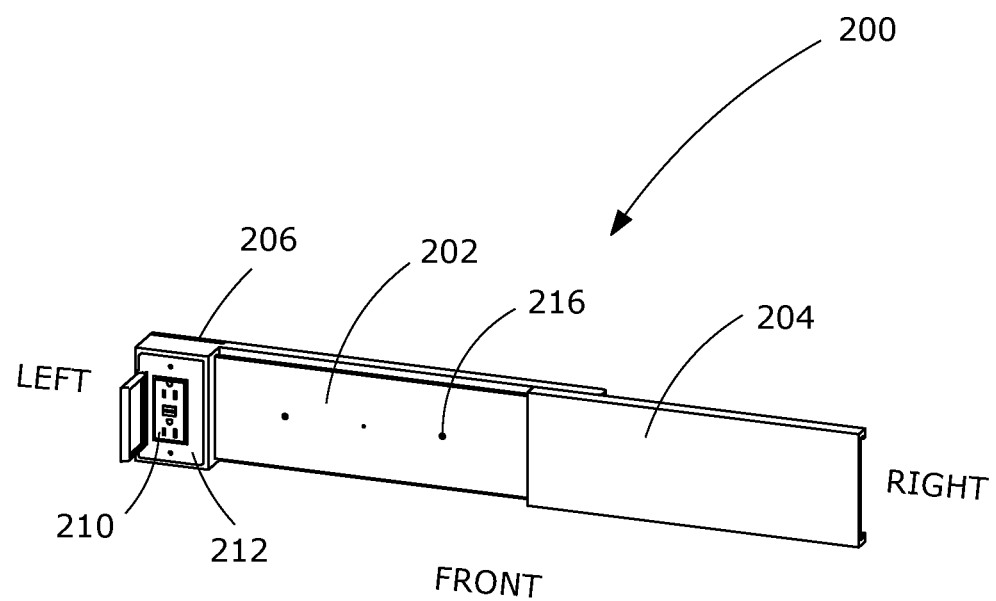

FIG. 18—A front perspective view of the portable window insert 200 depicted in FIGS. 13-17 extended for use (window not shown).

Figure 19:
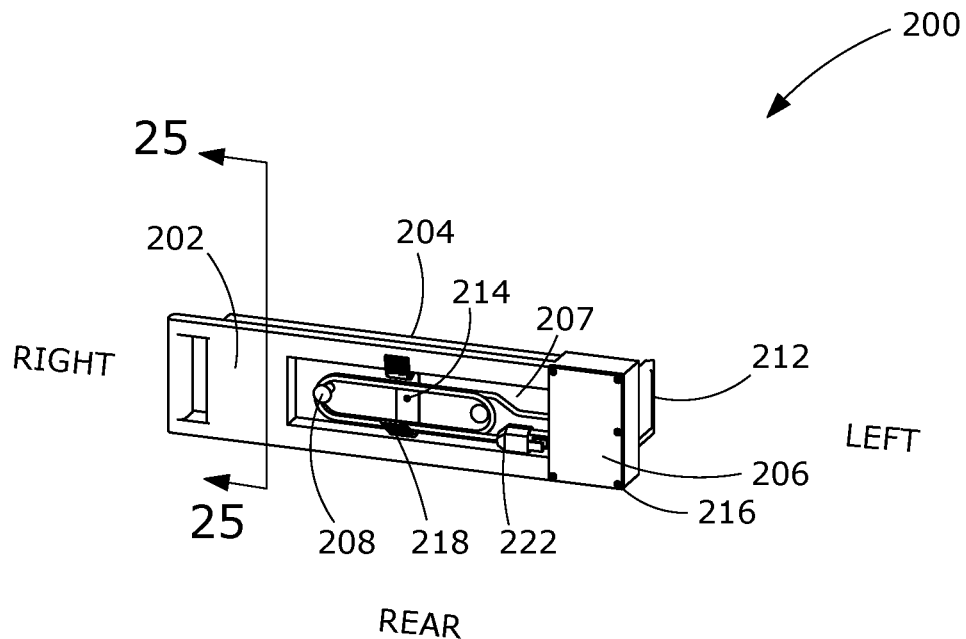

FIG. 19—A rear perspective view of the portable window insert 200 depicted in FIGS. 13-18 collapsed for easy transport by the user.

Figure 20:
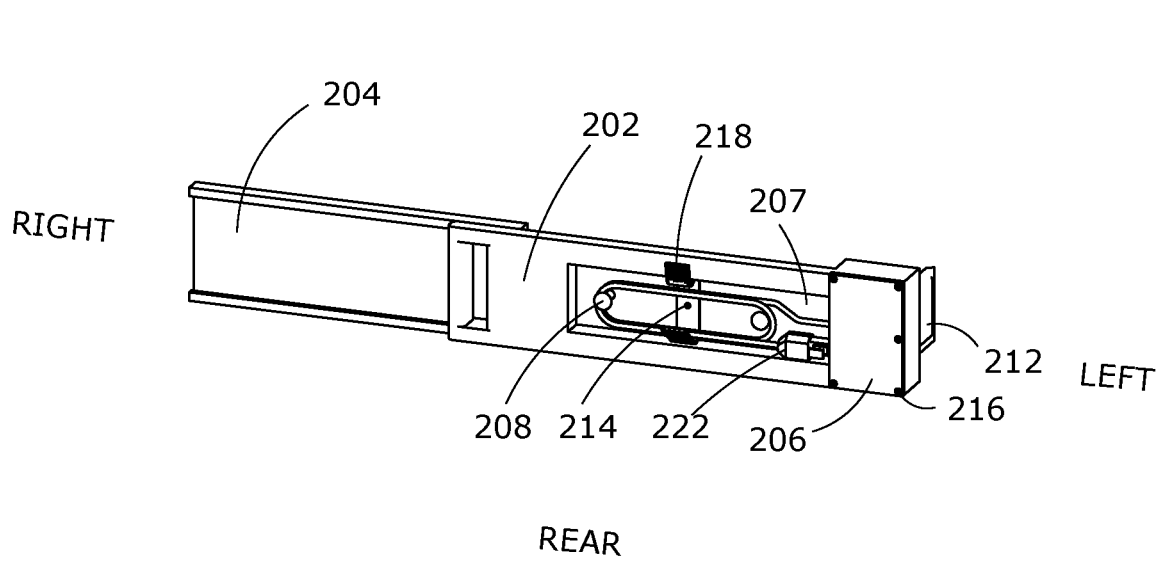

FIG. 20—A rear perspective view of the portable window insert 200 depicted in FIGS. 13-19 extended for use (window not shown).

Figure 21:
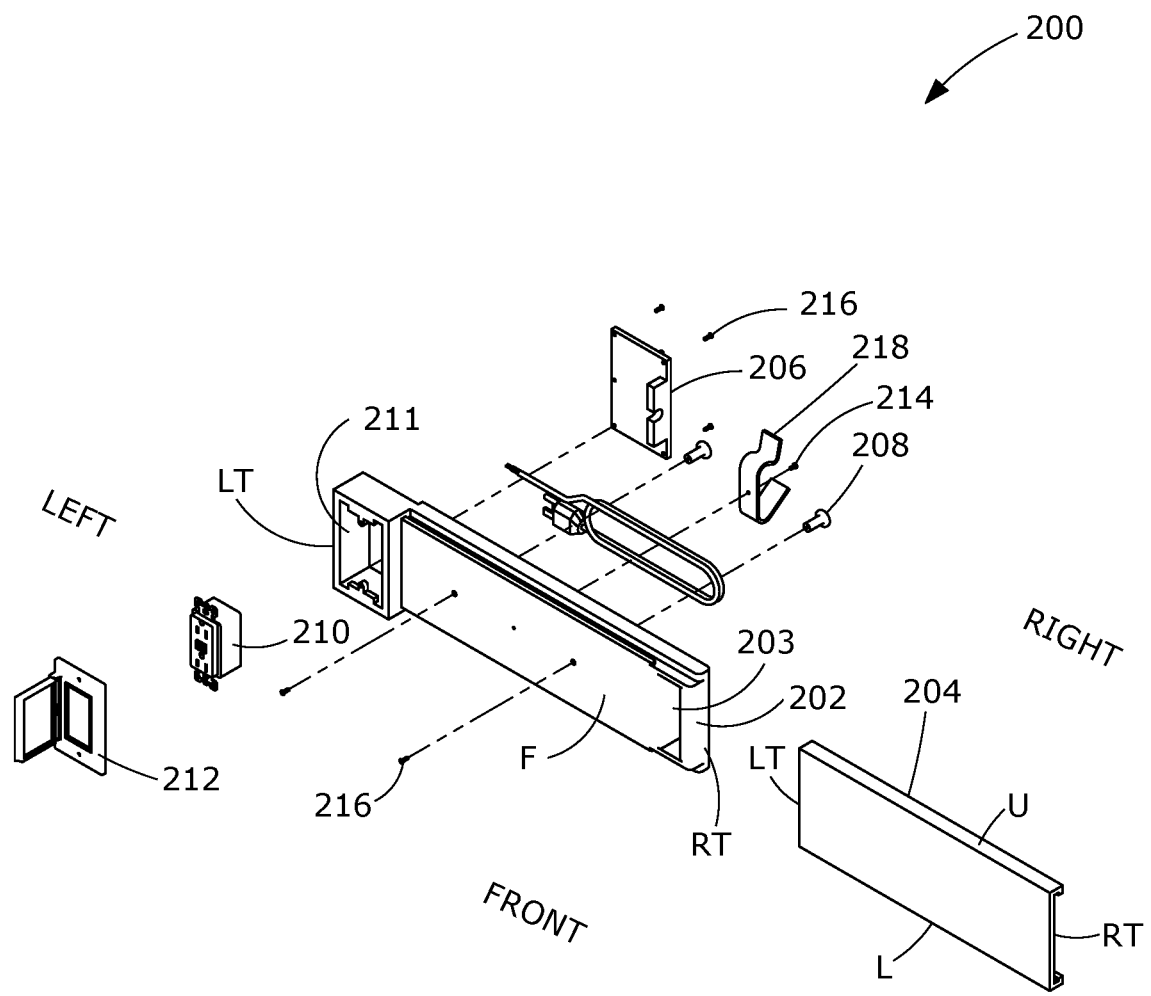

FIG. 21—An exploded font perspective view of the portable window insert 200 depicted in FIGS. 13-20 depicting all the elements thereof.

Figure 22:
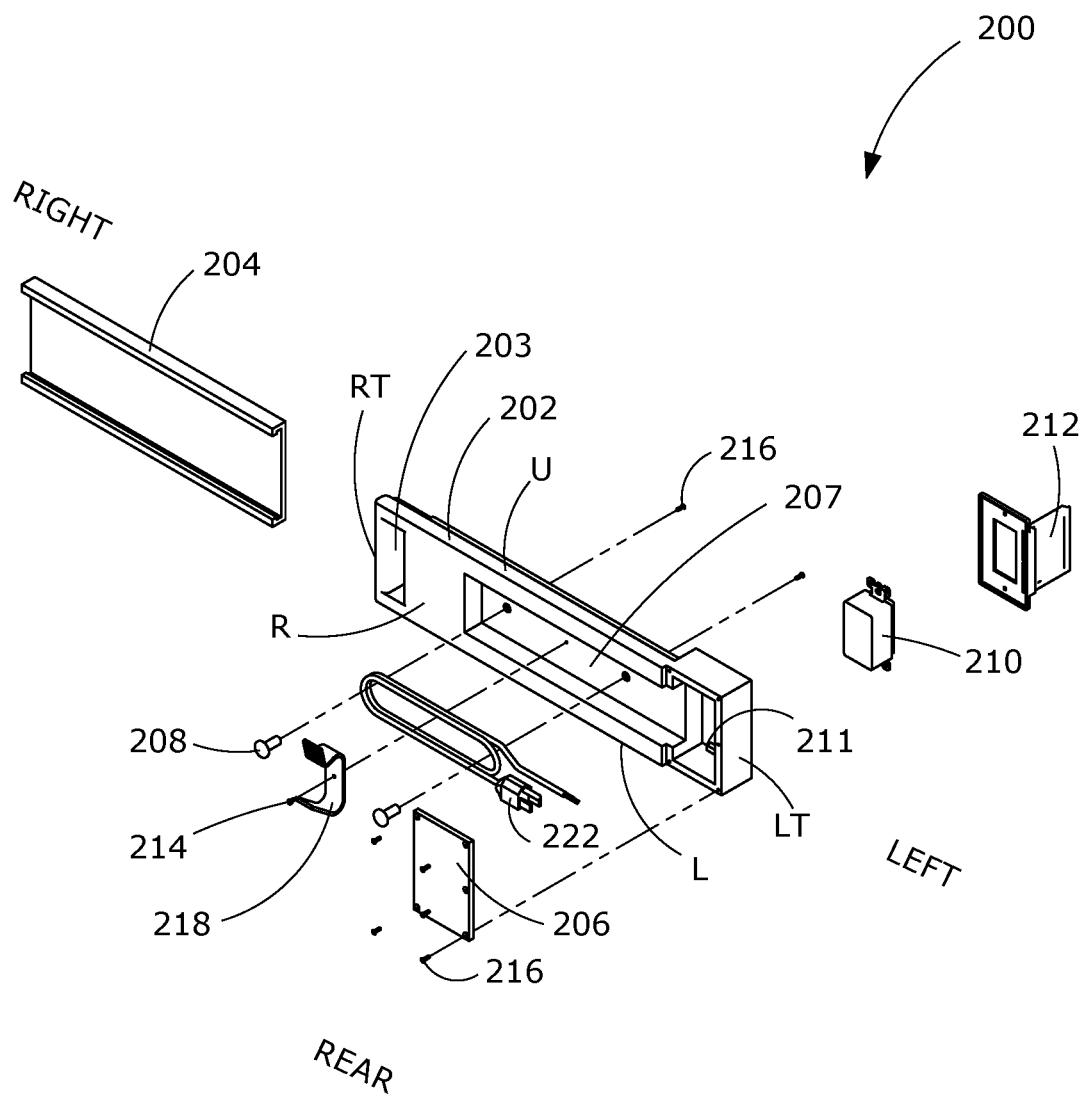

FIG. 22—An exploded rear perspective view of the portable window insert 200 depicted in FIGS. 13-21 depicting all the elements thereof.

Figure 23:
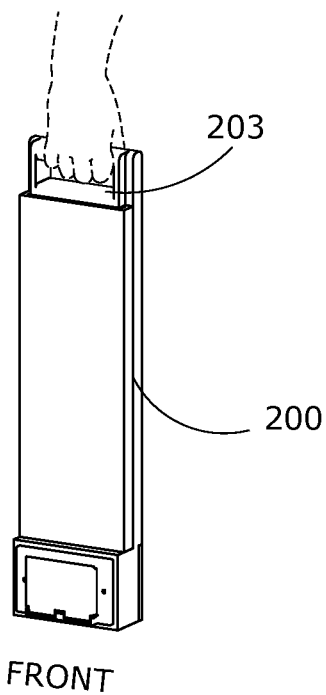

FIG. 23—A front perspective view of the portable window insert 200 depicted in FIGS. 13-22 collapsed and being transported by the user.

Figure 24:
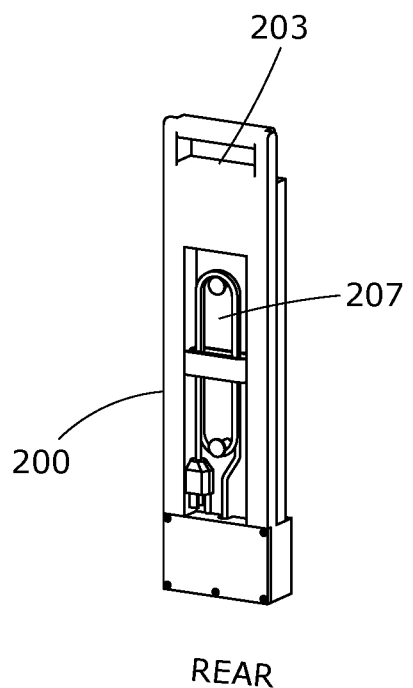

FIG. 24 a rear perspective view of the portable window insert 200 depicted in FIGS. 13-23 collapsed and ready to be transported by the user.

Figure 25:
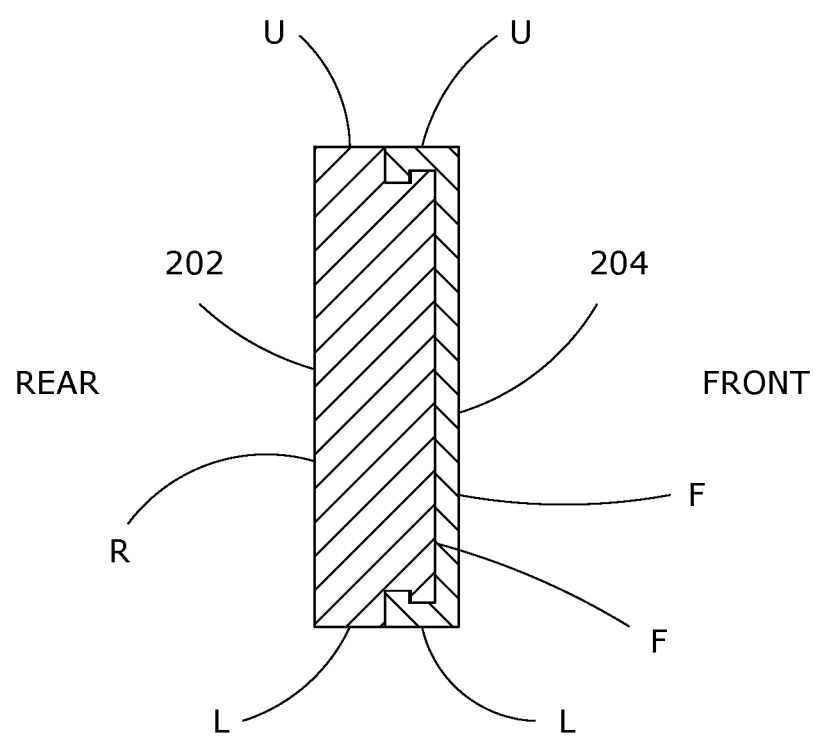

FIG. 25—A cross-sectional view of the portable window insert 200 of this invention taken along line 25-25 of FIG. 19.

Third Embodiment

Figure 26:
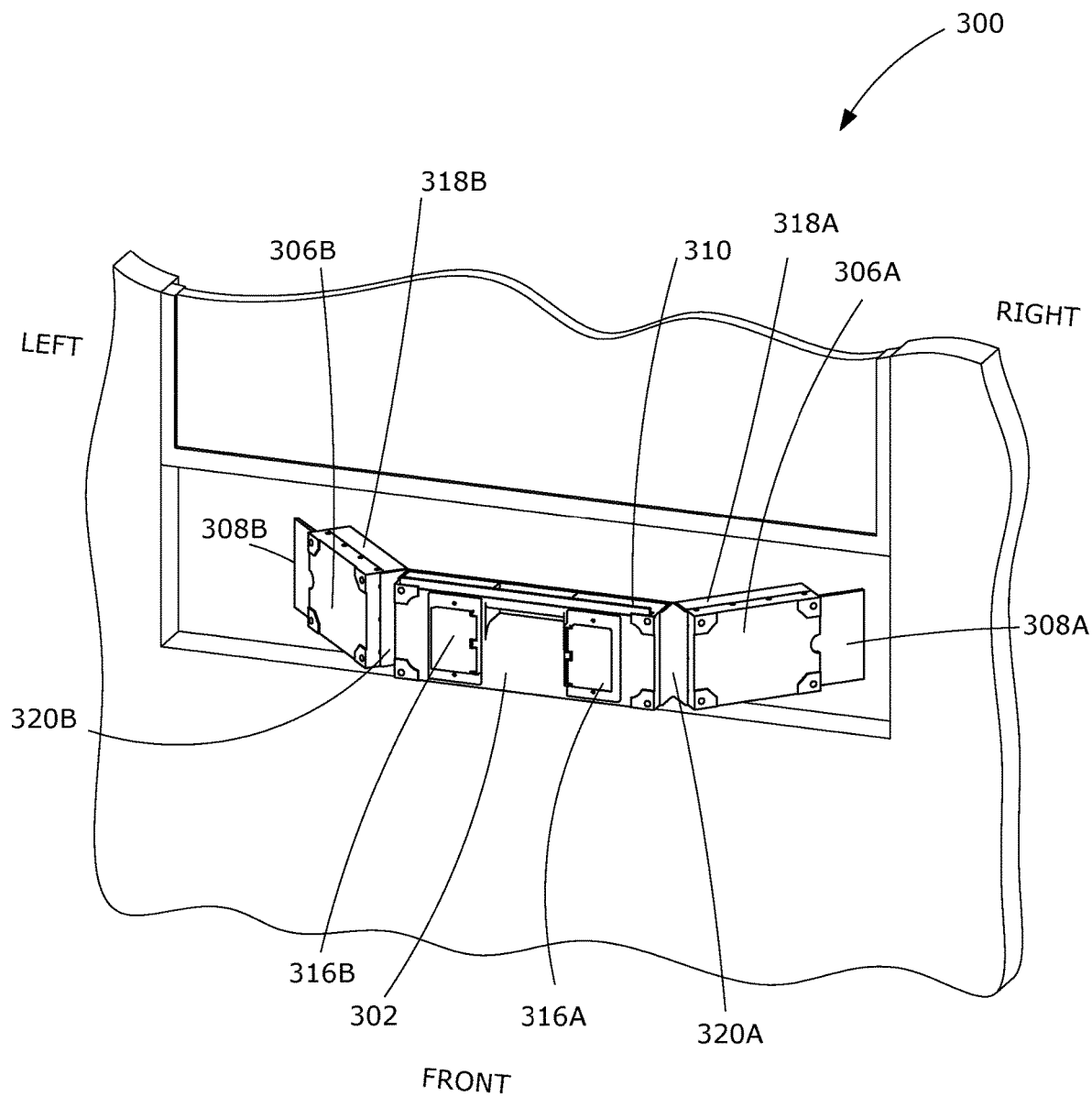

FIG. 26—A front perspective view of another embodiment of the portable window insert 300 placed in a partially opened window and partially extended for insertion in the window.

Figure 27:
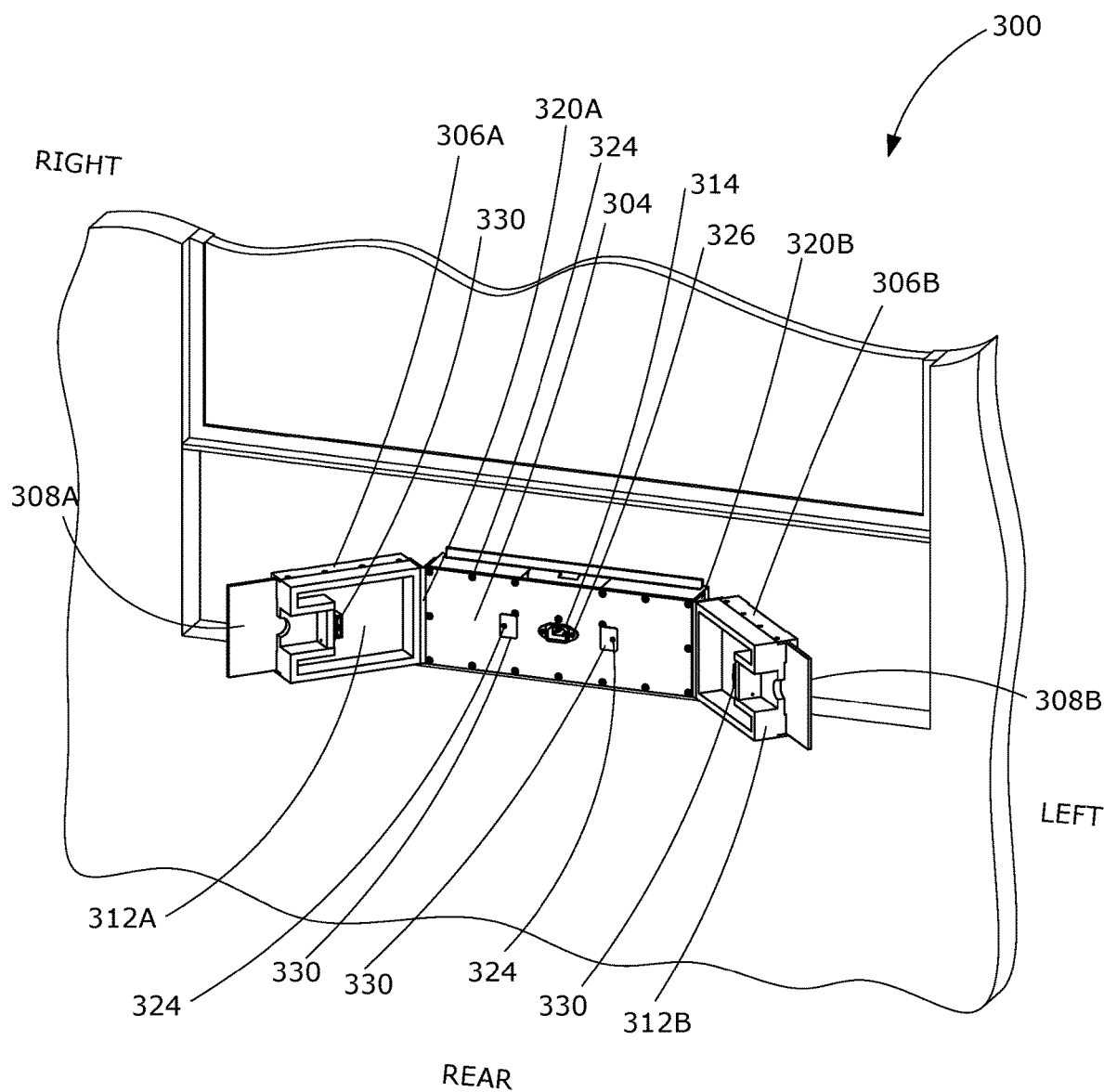

FIG. 27—The rear perspective view of the embodiment of the portable window insert 300 depicted in FIG. 26 placed in a partially opened window and partially extended for insertion in the window.

Figure 28:
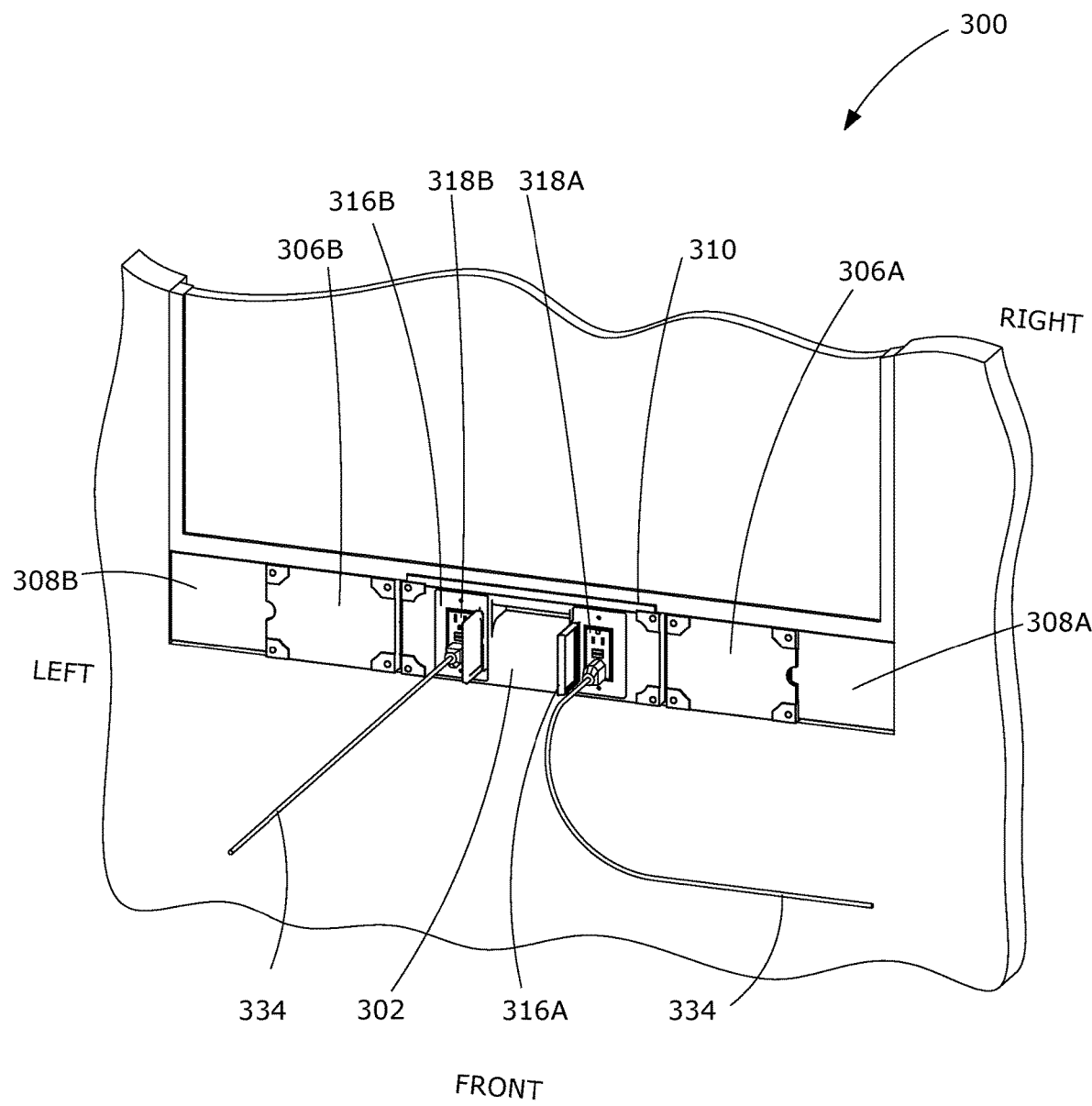

FIG. 28—A front perspective view of the portable window insert 300 depicted in FIGS. 26-27 fully installed in the window with electrical cables 334 plugged into receptacles 318A, 318B mounted therein.

Figure 29:
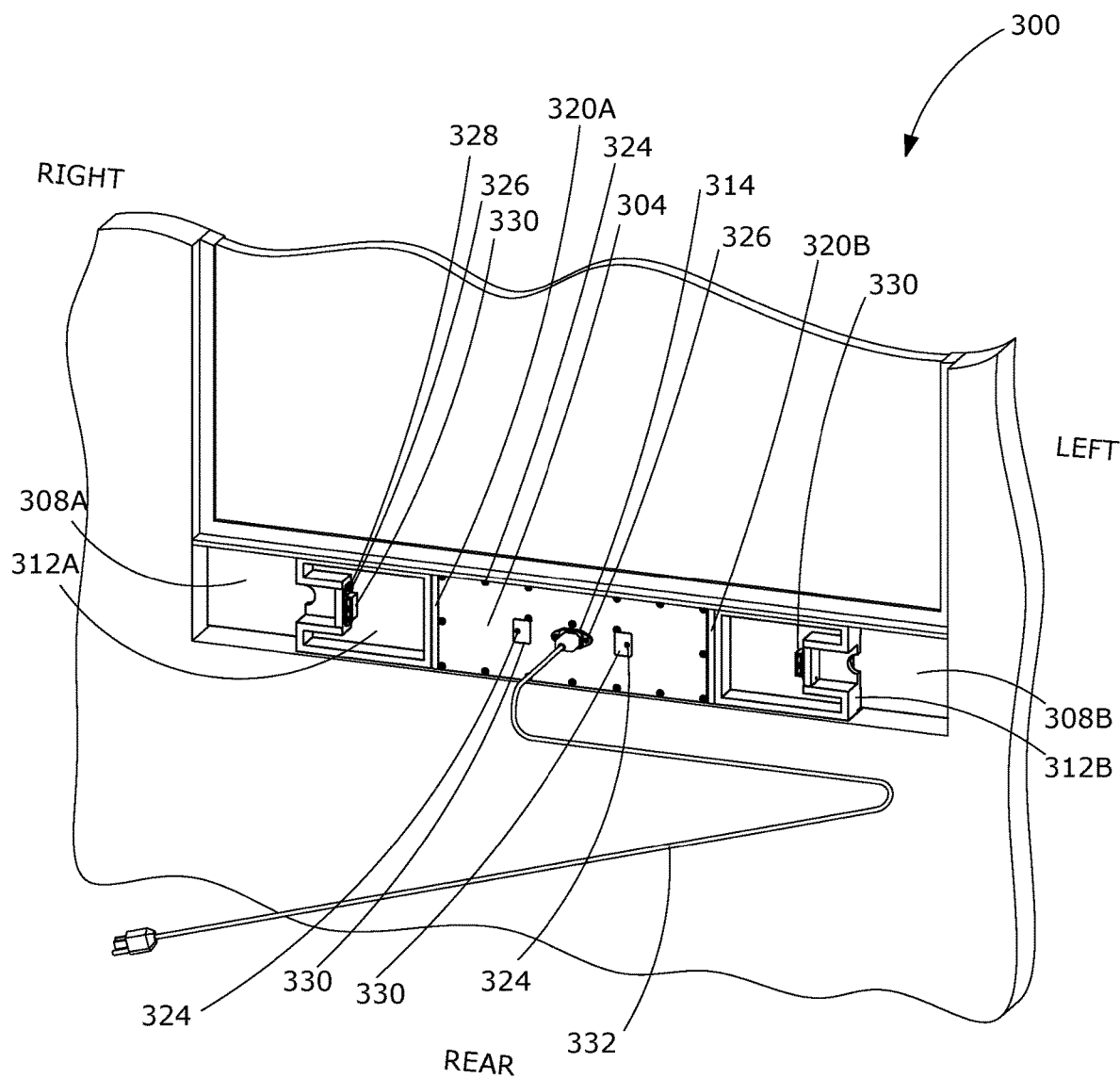

FIG. 29—A rear perspective view of the portable window insert 300 depicted in FIGS. 26-28 fully installed in the window and extending therefrom is an electrical cable 332 and plug that are in electrical communication with the receptacles 318A, 318B depicted in FIG. 28.

Figure 30:
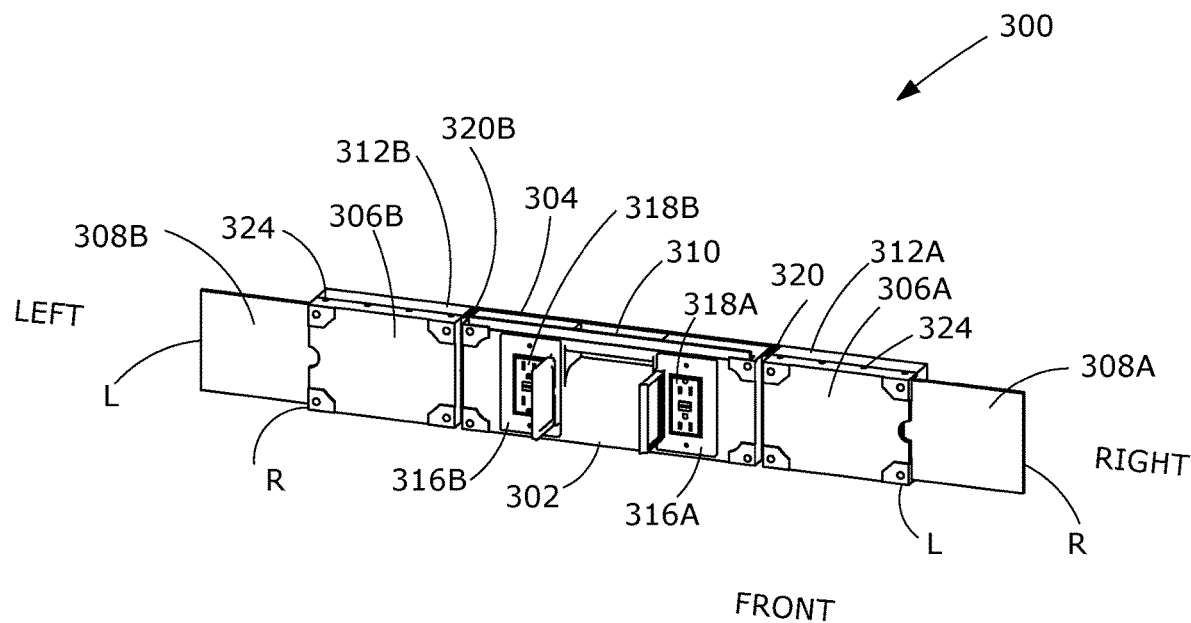

FIG. 30—A front perspective view of the portable window insert 300 depicted in FIGS. 26-29 extended for use (window not shown).

Figure 31:
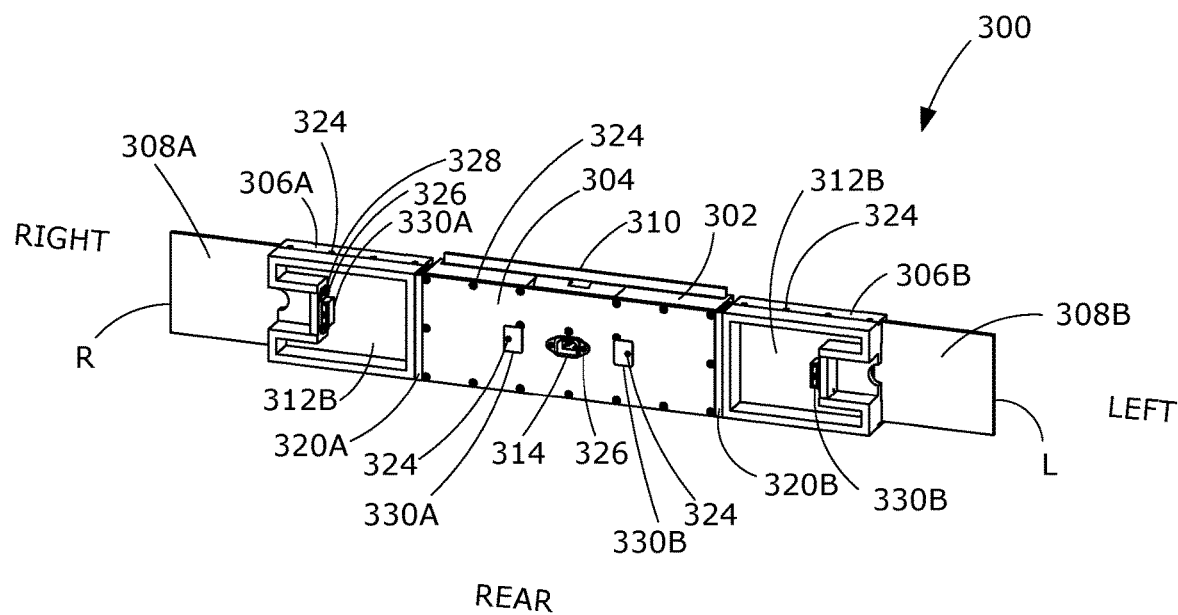

FIG. 31—A rear perspective view of the portable window insert 300 depicted in FIGS. 26-30 extended for use (window not shown).

Figure 32:
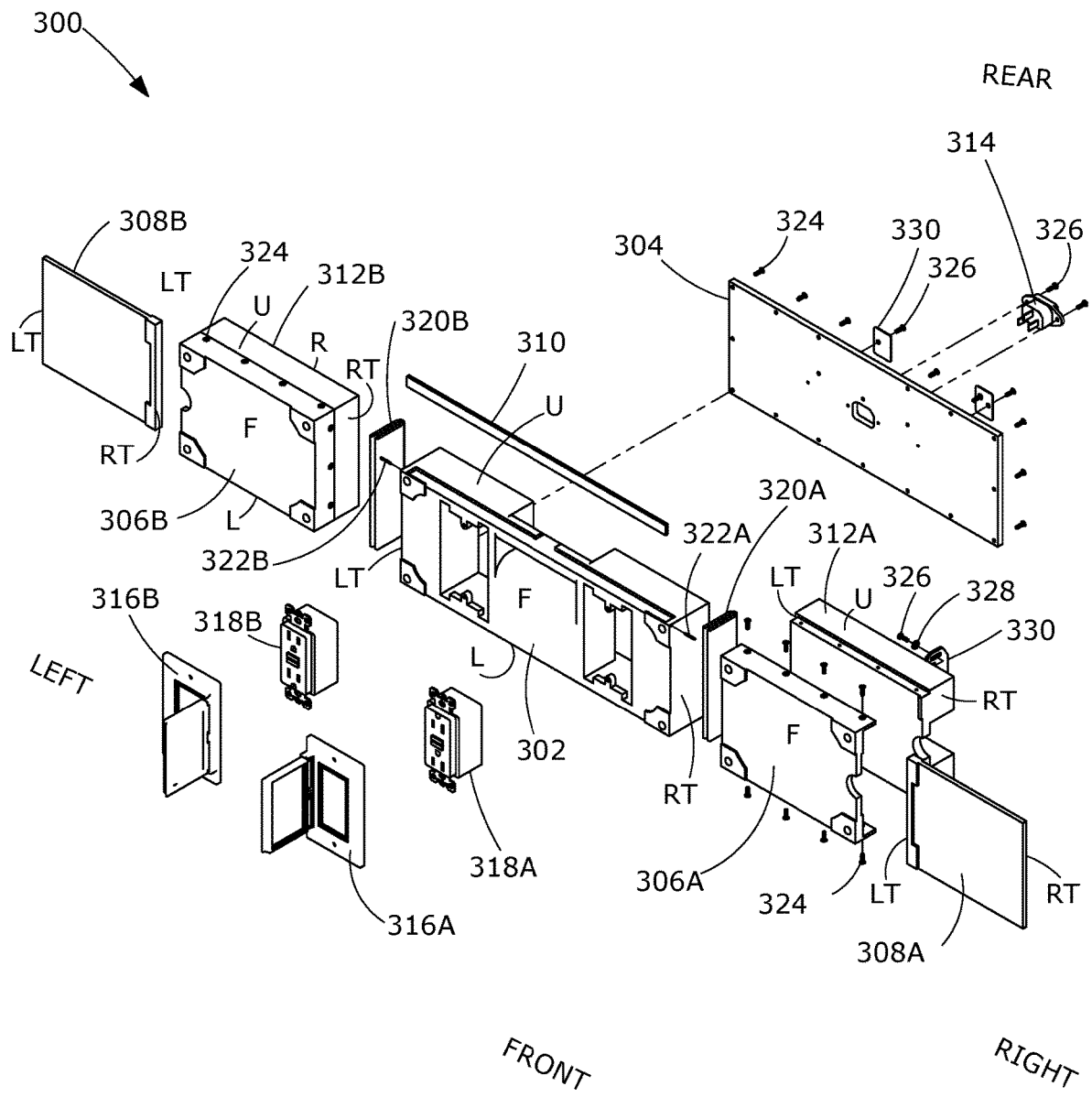

FIG. 32—An exploded front perspective view of the portable window insert 32 depicted in FIGS. 26-31 depicting all the elements thereof.

Figure 33:
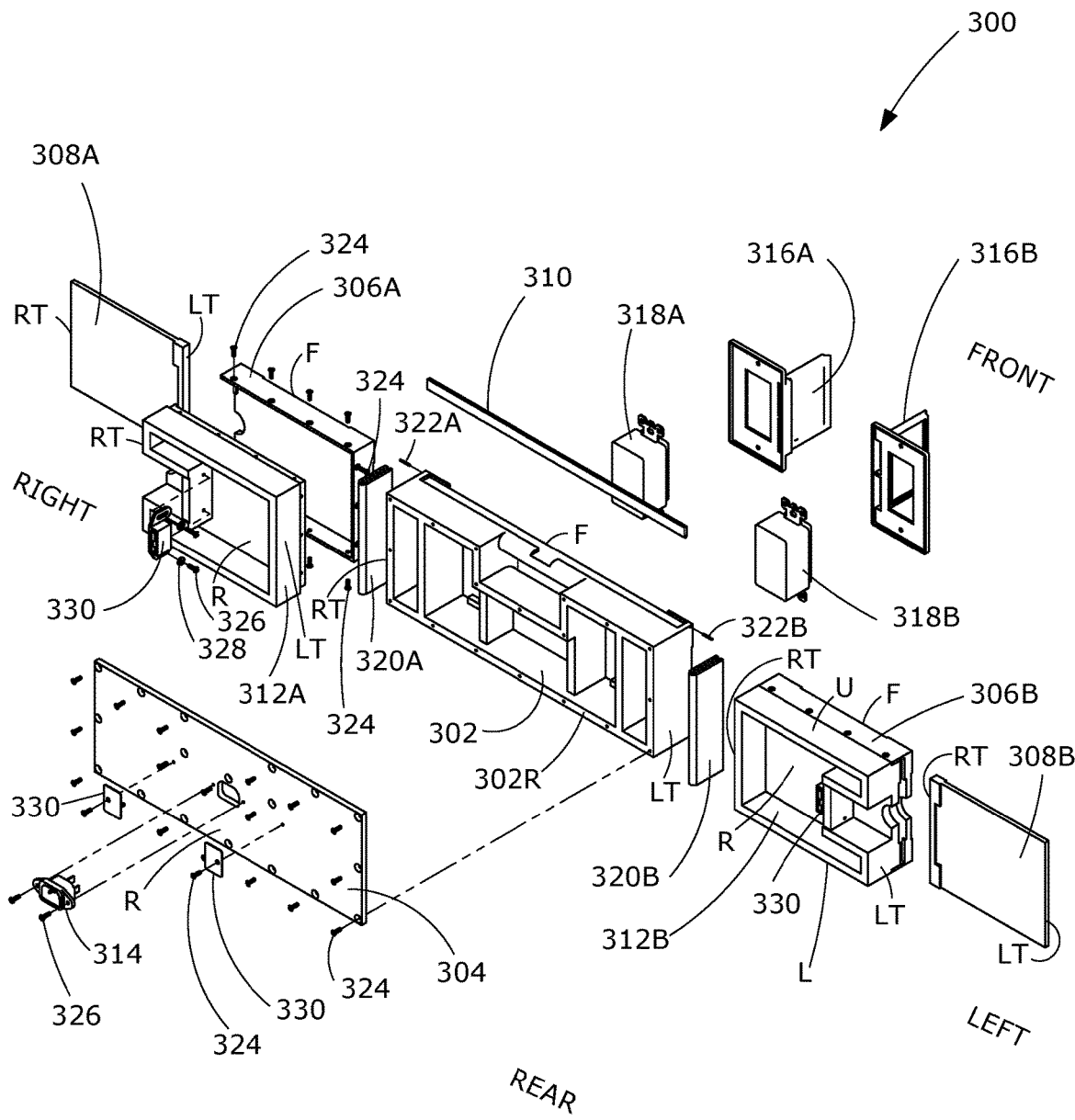

FIG. 33—An exploded rear perspective view of the portable window insert 300 depicted in FIGS. 26-32 depicting all the elements thereof.

Figure 34:
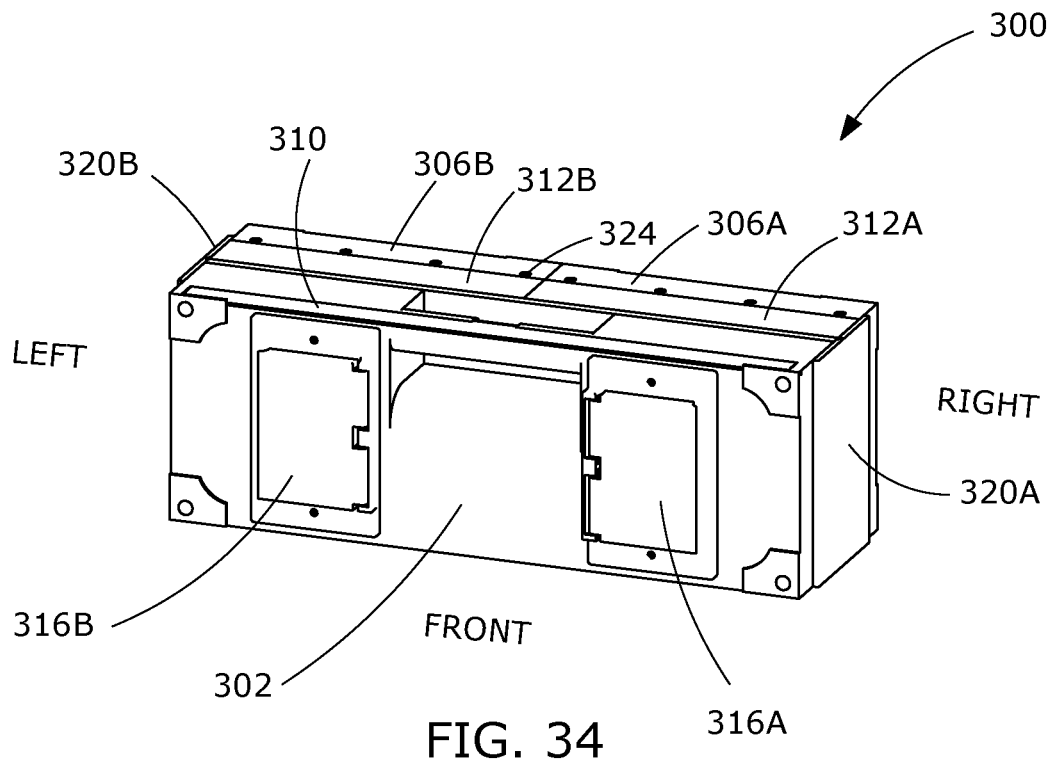

FIG. 34 A front perspective view of the portable window insert 300 depicted in FIGS. 26-33 collapsed and ready to be transported by the user.

Figure 35:
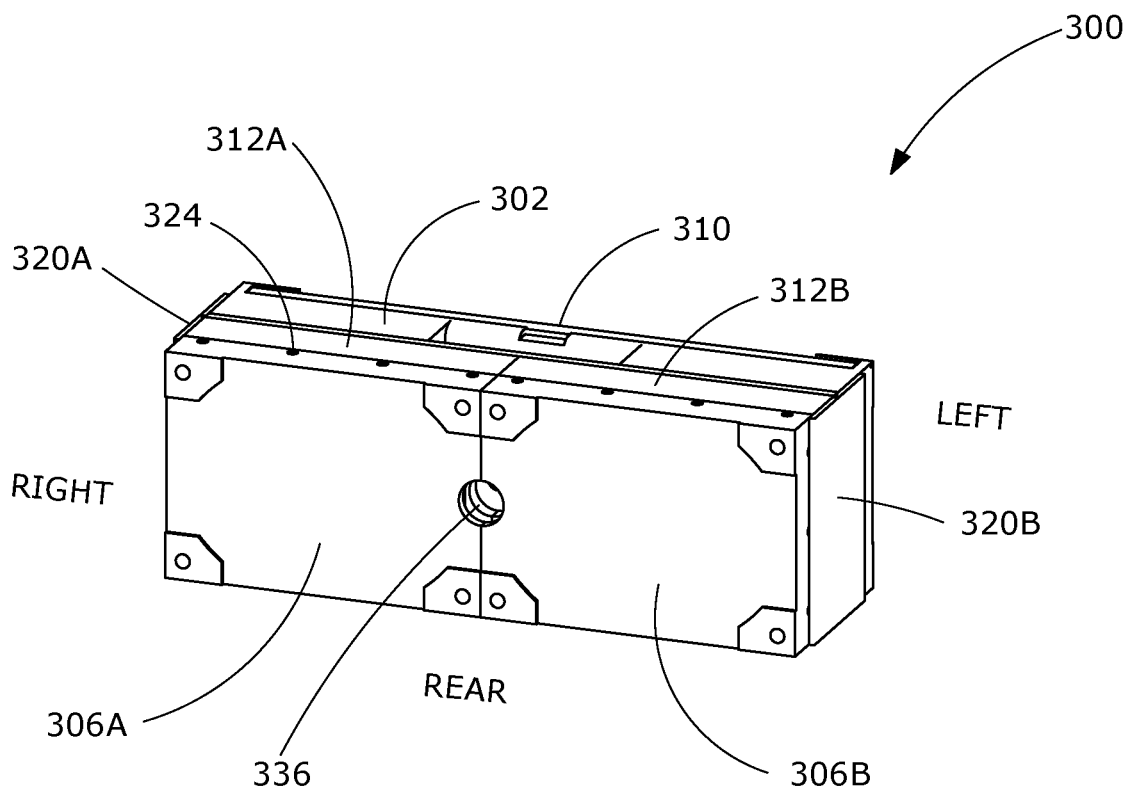

FIG. 35—A rear perspective view of the portable window insert 300 depicted in FIGS. 26-34 collapsed and ready to be transported by the user.

The drawings are not presented to scale but are only used to illustrate the principles of the invention. In the drawings, like reference numbers indicate like elements.

First, Second and Third Embodiment

Sub-Embodiments

Figure 36:
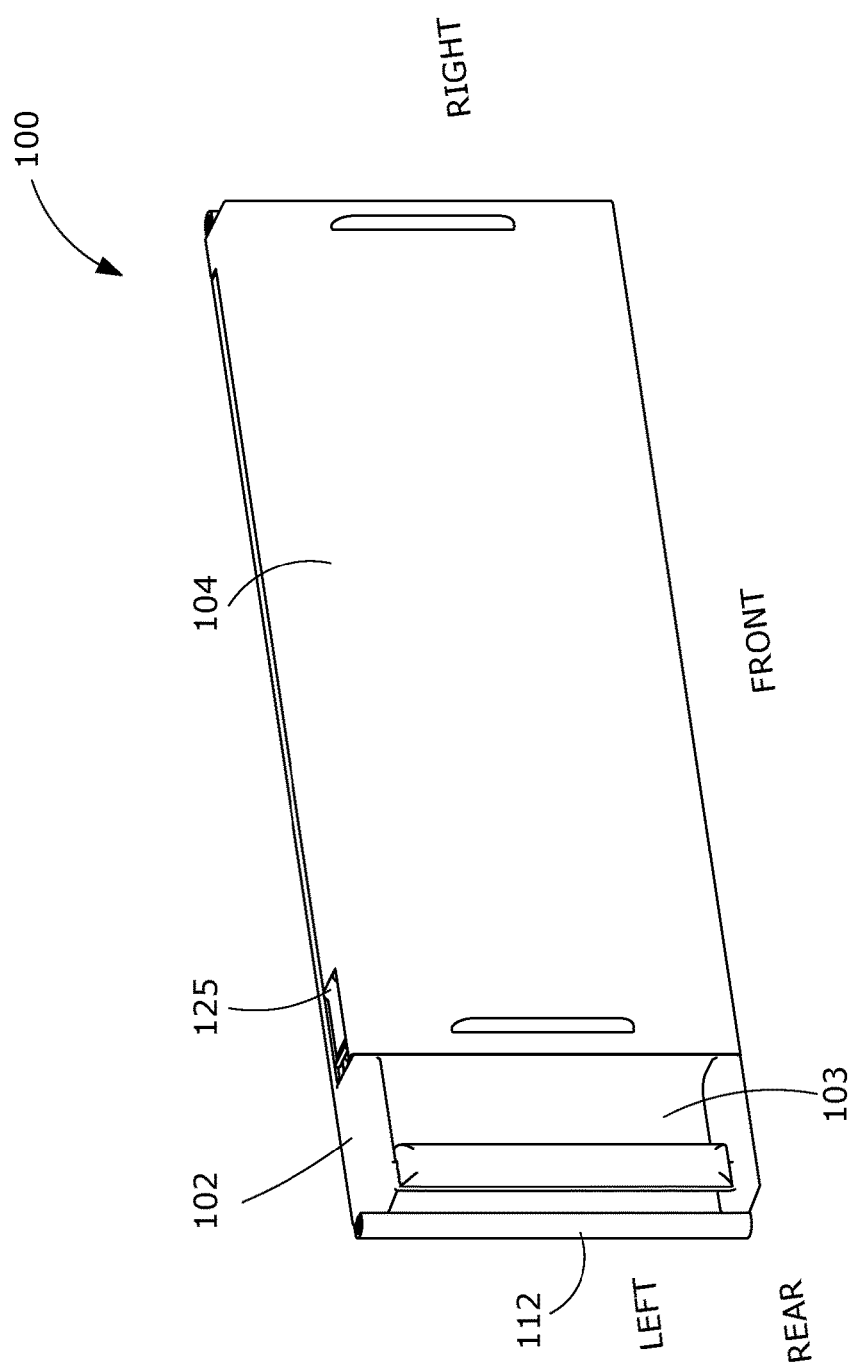
Figure 37:
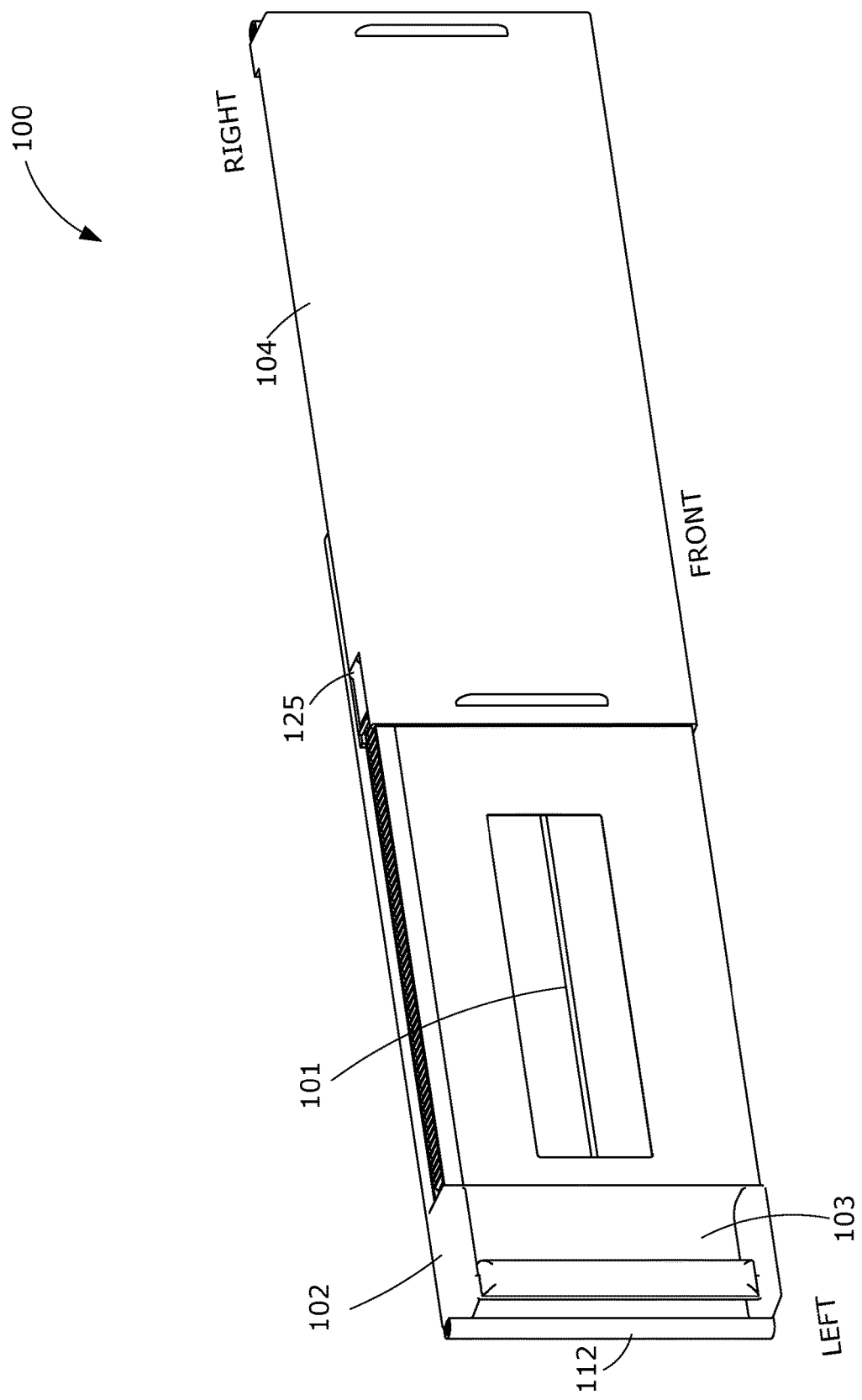
Figure 38:
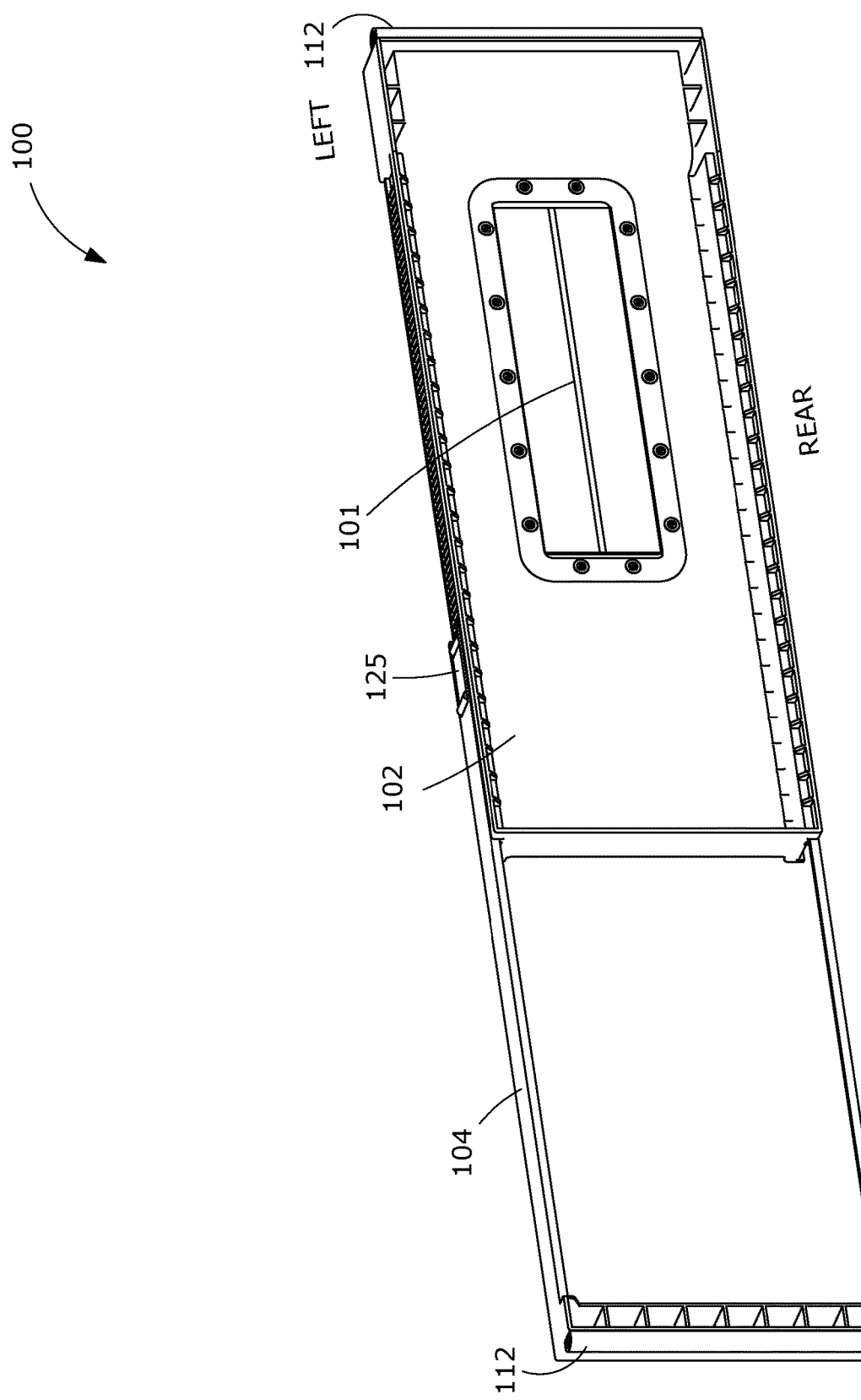

FIGS. 36-38 are several views of a sub-embodiment of the First Embodiment of this invention:

FIG. 36 being a front perspective view of the sub-embodiment in the closed position;

FIG. 37 being a front perspective view of the sub-embodiment in the opened or expanded position; and FIG. 38 being a rear perspective view of the sub-embodiment in the opened or expanded position.

Figure 39:
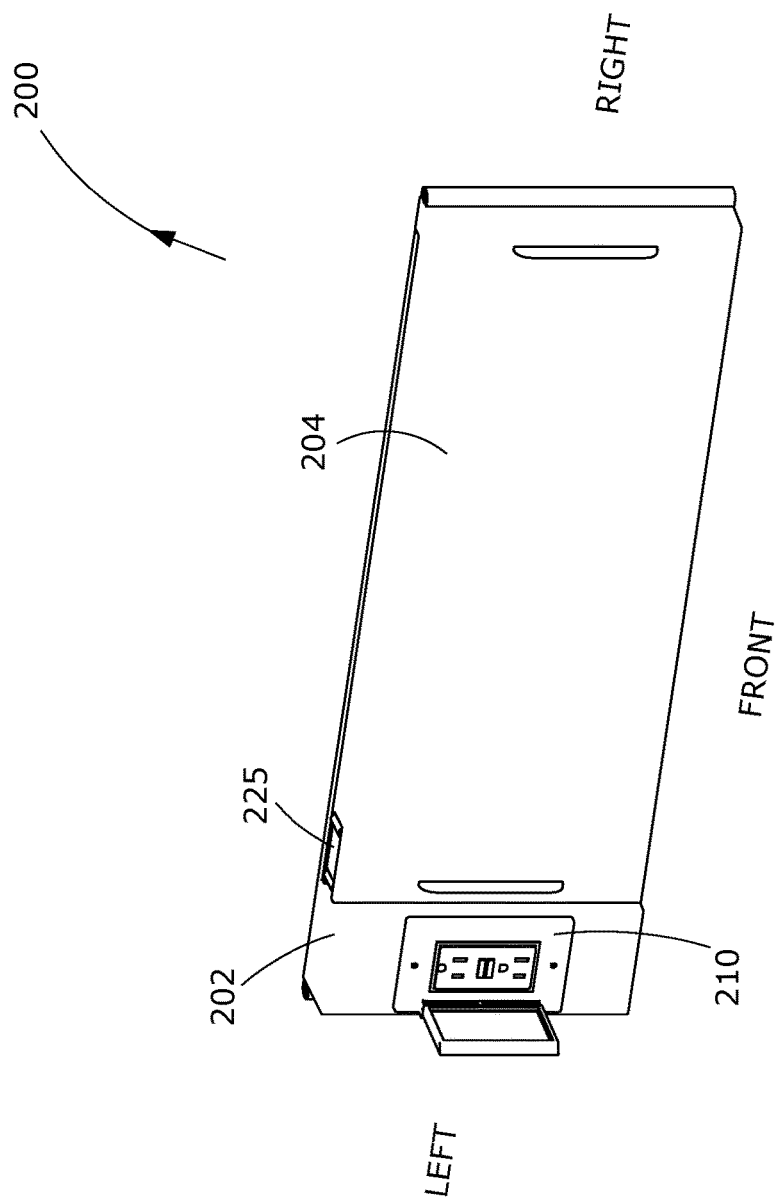
Figure 40:
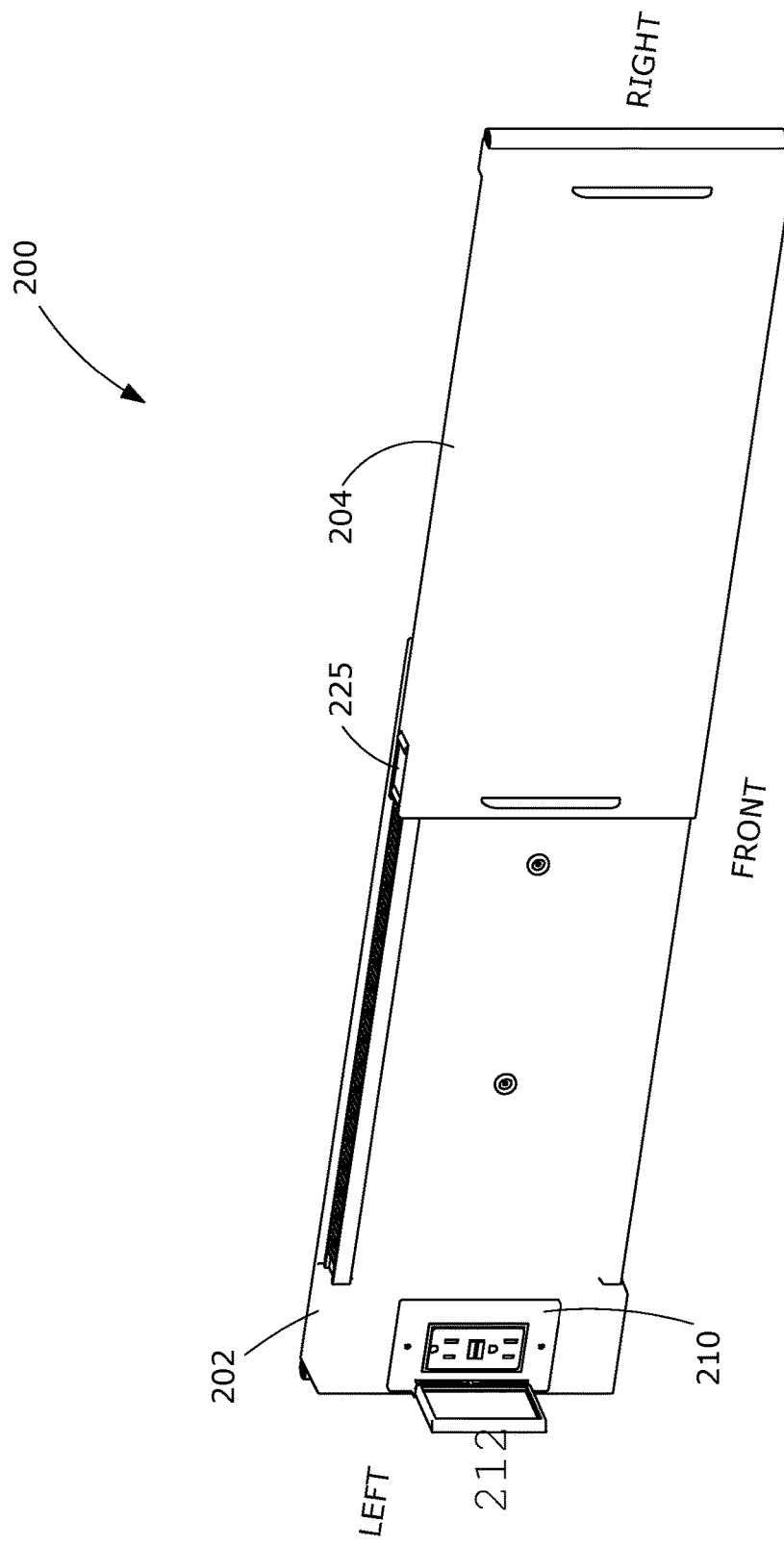
Figure 41:
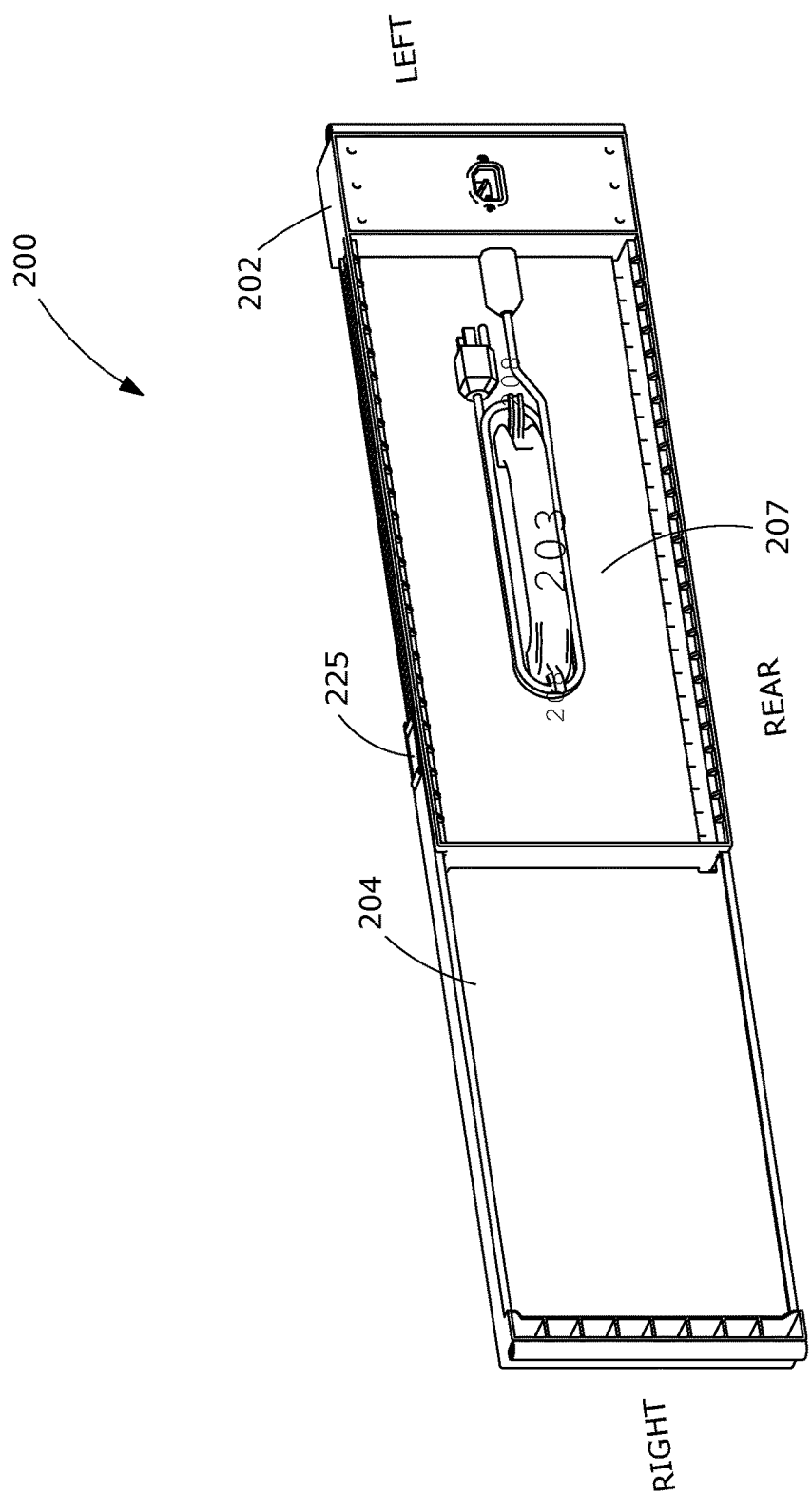

FIGS. 39-41 are several views of a sub-embodiment of the Second Embodiment of this invention:

FIG. 39 being a front perspective view of the sub-embodiment in the closed position;

FIG. 40 being a front perspective view of the sub-embodiment in the opened or expanded position; and FIG. 41 being a rear perspective view of the sub-embodiment in the opened or expanded position.

Figure 42:
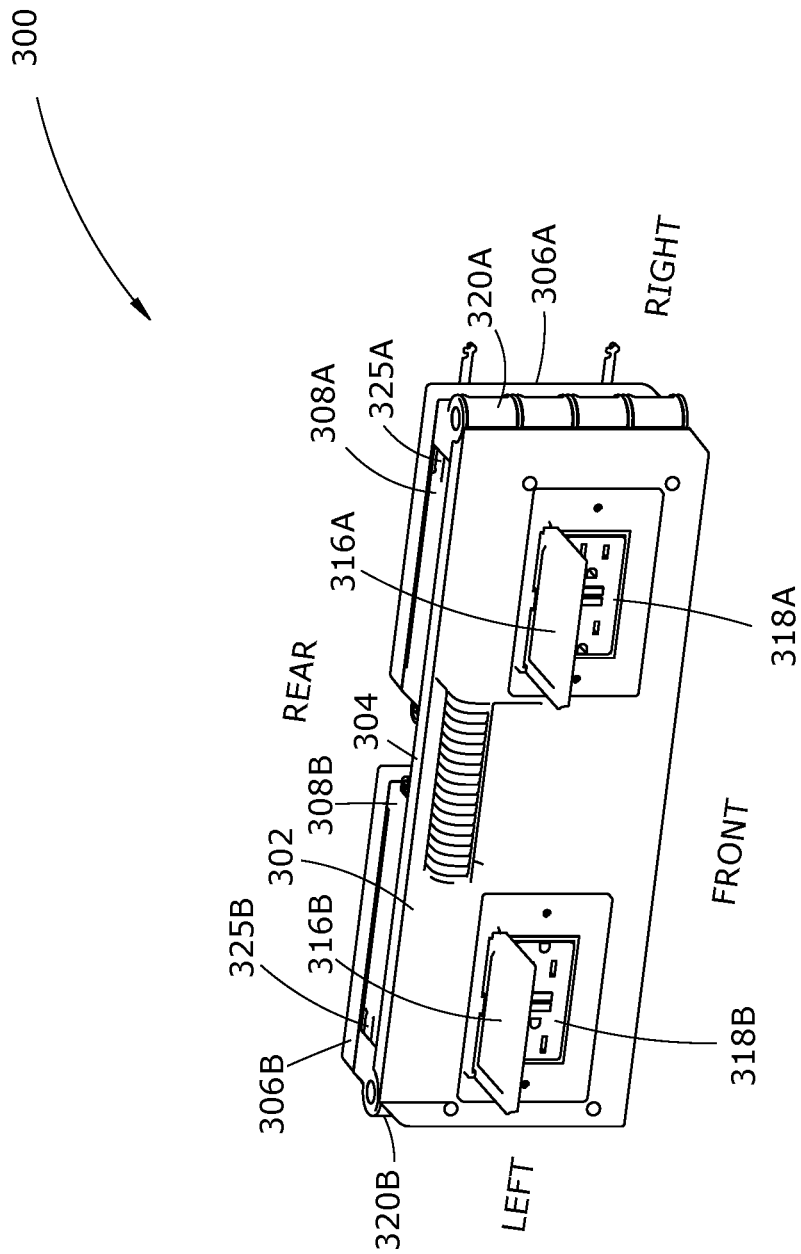
Figure 43:
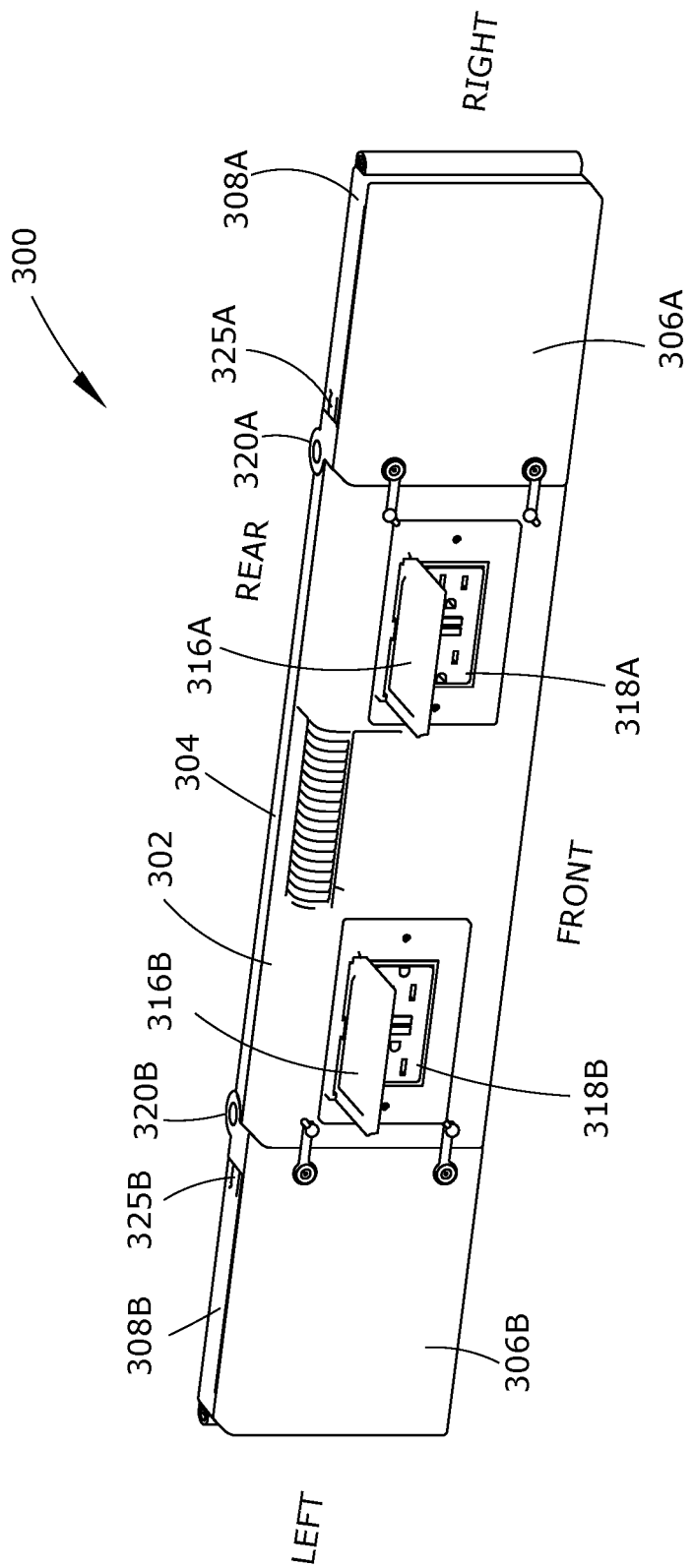
Figure 44:
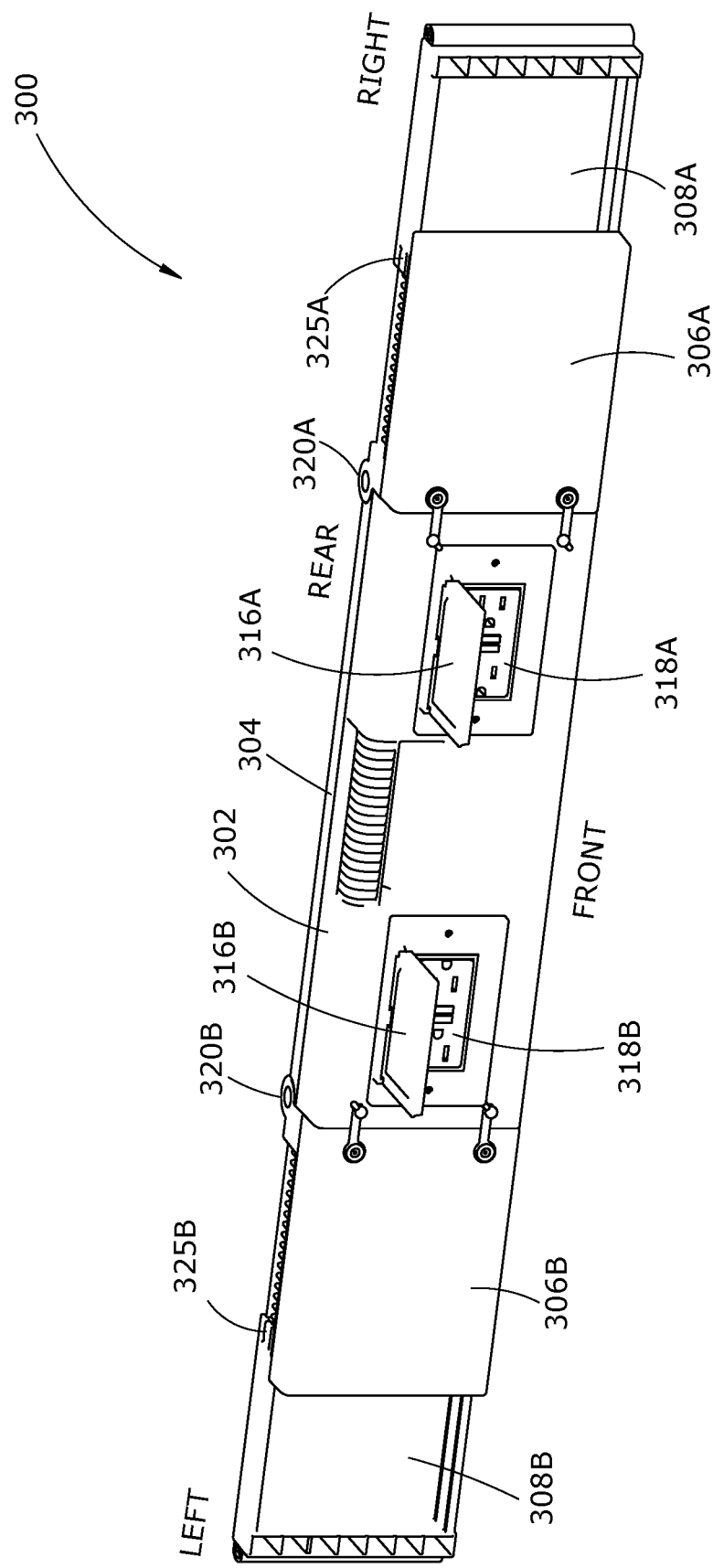
Figure 45:
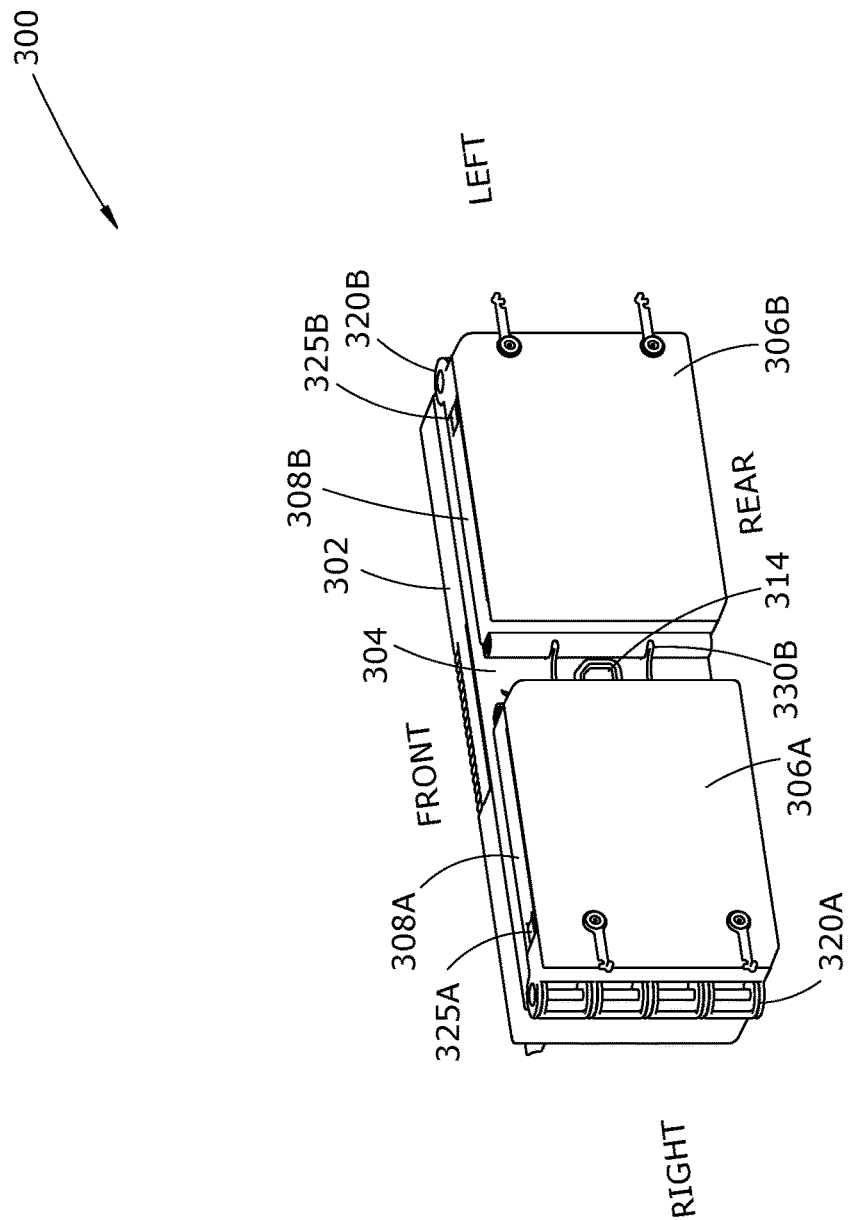
Figure 46:
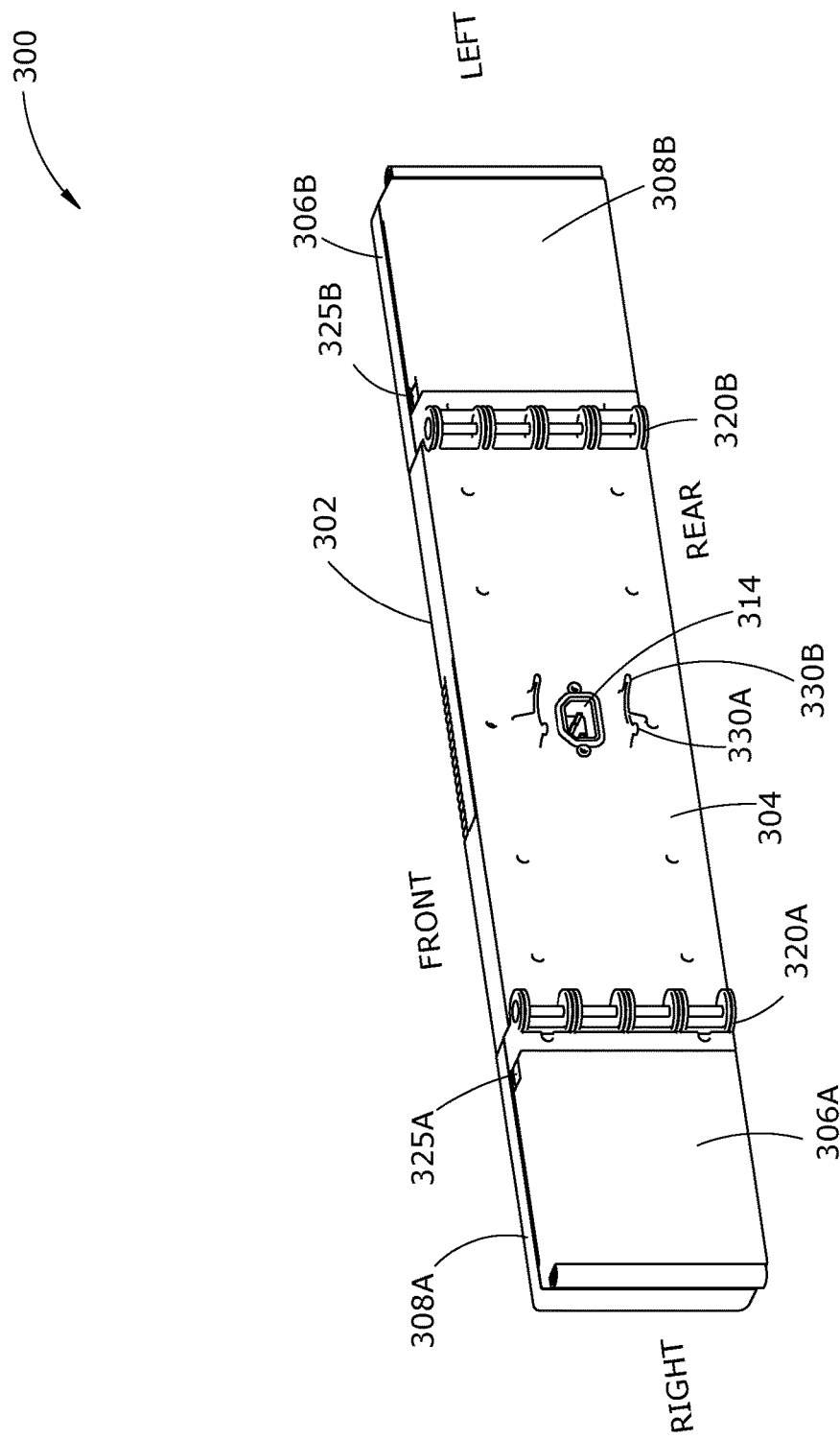
Figure 47:
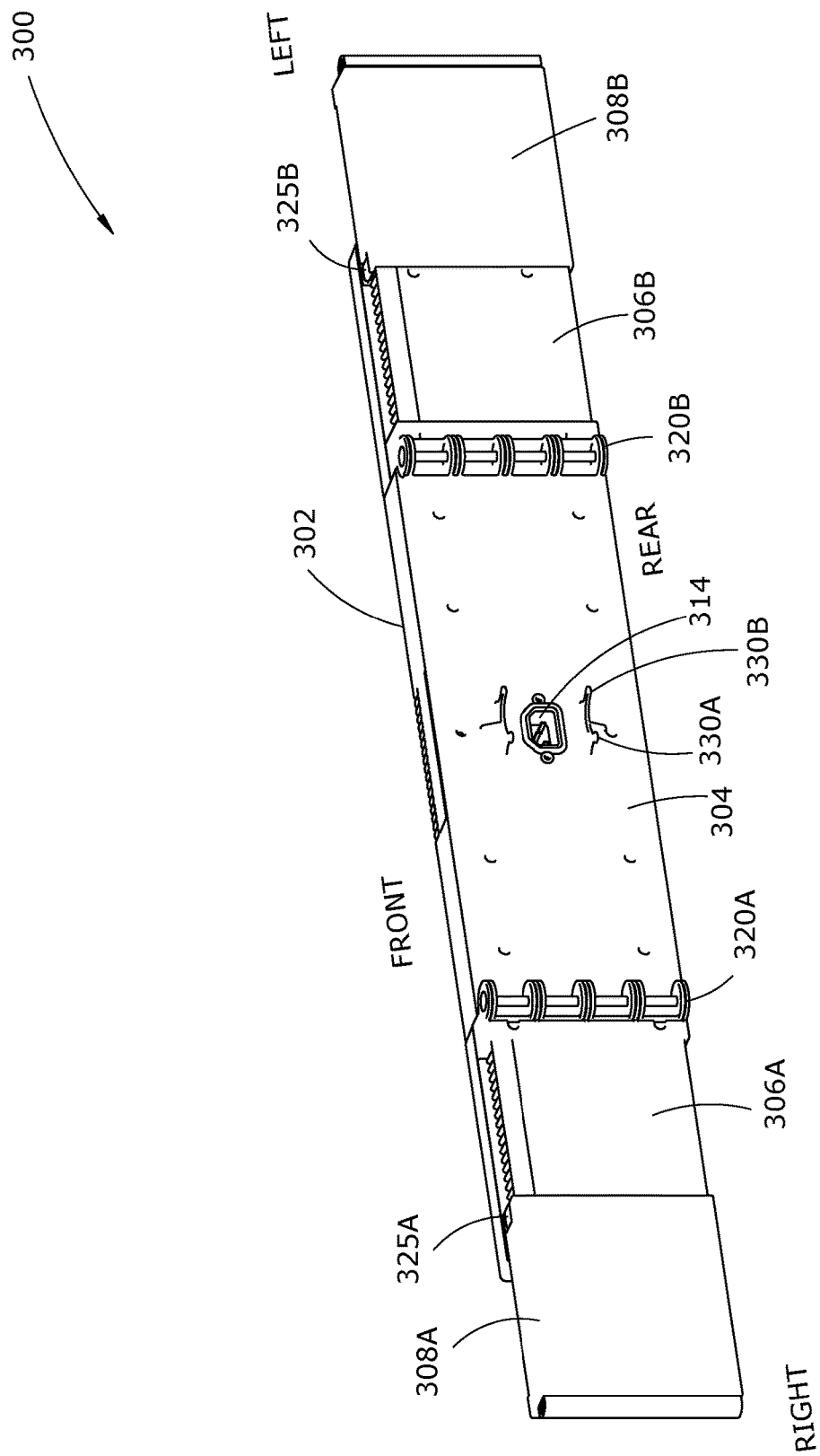

FIGS. 42-47 are several views of a sub-embodiment of the Third Embodiment of this invention:

FIG. 42 being a front perspective view of the sub-embodiment in the closed position;

FIG. 43 being a front perspective view of the sub-embodiment in the partially opened or partially expanded position;

FIG. 44 being a front perspective view of the sub-embodiment in the fully opened or fully expanded position;

FIG. 45 being a rear perspective view of the sub-embodiment in the closed position;

FIG. 46 being a rear perspective view of the sub-embodiment in the partially opened or partially expanded position; and FIG. 47 being a rear perspective view of the sub-embodiment in the fully opened or fully expanded position.

DETAILED DESCRIPTION OF THE INVENTION

Detailed descriptions of the embodiments of this invention are provided herein along with accompanying figures that illustrate the principles of the embodiments. The scope of the embodiments is limited only by the claims and encompasses numerous alternatives, modifications and equivalents. Numerous specific details are set forth in the following description. These details are provided solely for the purposes of example and the embodiments may be practiced according to the claims without some or all of these specific details.

Applicant describes herein three "embodiments" of the invention. This terminology is used for convenience and is not to be considered limiting. There are numerous embodiments described and claimed herein. For example, each embodiment may have sub-embodiments and a grouping of sub-embodiments may form another embodiment.

Generally, for ease of understanding, when referring to the "front" of an embodiment of the portable window insert described and claimed herein we are referring to the face of the window insert that is on the interior of an enclosure. Additionally, when referring to the "rear" of an embodiment of the portable window insert described and claimed herein we are referring to the face of the window insert that is on the exterior of the enclosure. For ease of understanding all of the figures herein are labeled with a FRONT and REAR indicia. It should be understood that the portable window inserts of this invention may be used with the "front" as described herein facing the exterior of the enclosure and the "rear" facing the interior of the enclosure or vice versa.

Generally, for ease of understanding, when referring to a "right" or "left" portion of an element of this invention it is to be understood that the viewer is facing the "front" of the portable window insert. For ease of understanding most of the figures are labeled with a "Right" and "Left" indicia.

By the use of the term "utilities" herein it is broadly meant services such as, but not limited to heat, air-conditioning, ventilation, HVAC venting, compressed air and gases, electricity, internet cables, water, and telephone cables.

By the use of the term "utilities lines" it is broadly meant the pipes, tubes, cables, hoses and wires through which the utilities are carried.

It is preferred that all of the embodiments be made from a polymeric, i.e., plastic material, although any material may be used as long as it does not interfere with the functionality or safety of the device.

First Embodiment

Referring now to the drawings, in which like numerals represent like elements throughout the several views, FIGS. 1-12 depict the First Embodiment of the portable window insert 100 of this invention.

Figure 9:
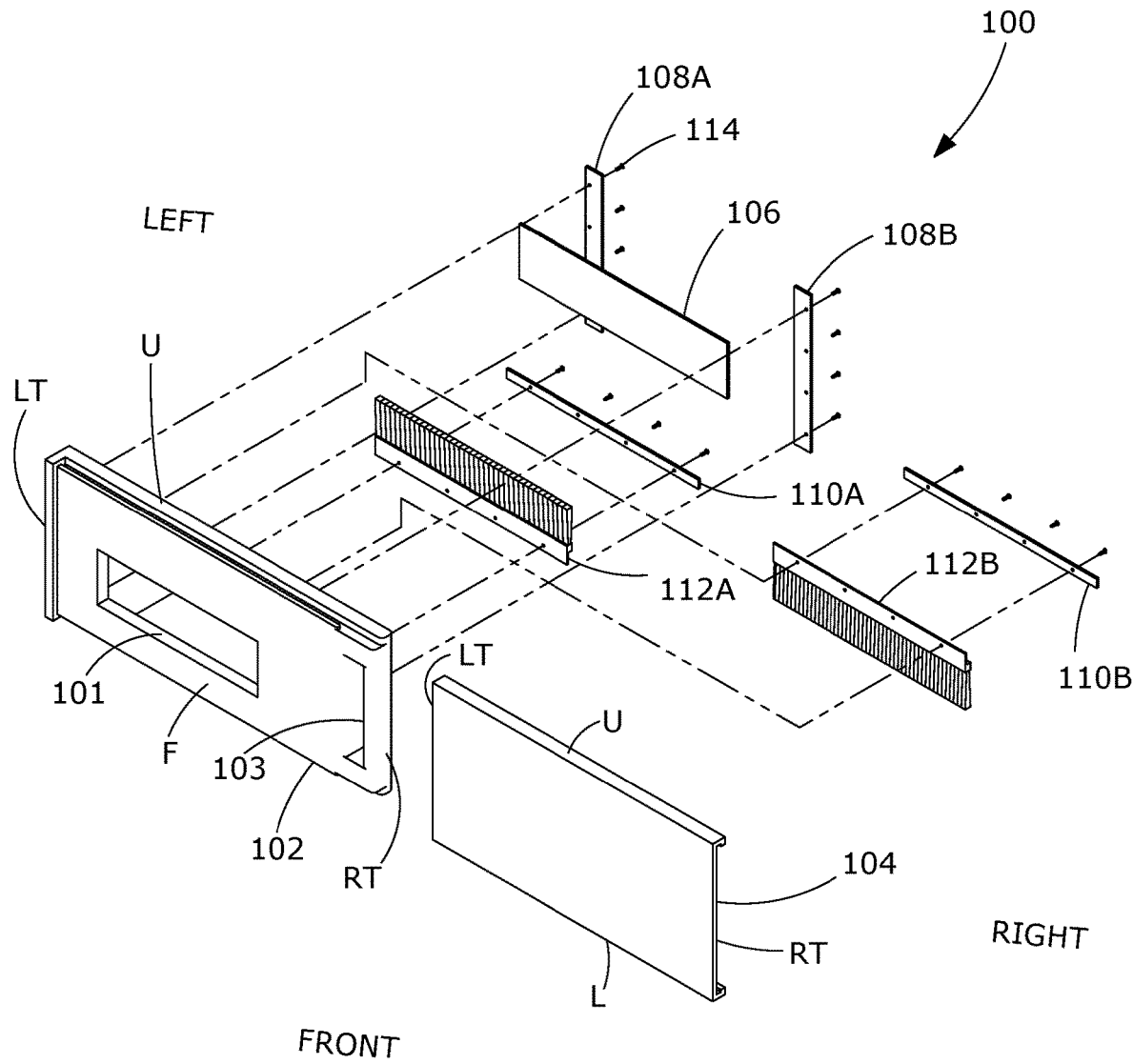
FIG. 9—An exploded front perspective view of the portable window insert 100 depicted in FIGS. 1-8 showing all the elements thereof.
Figure 10:
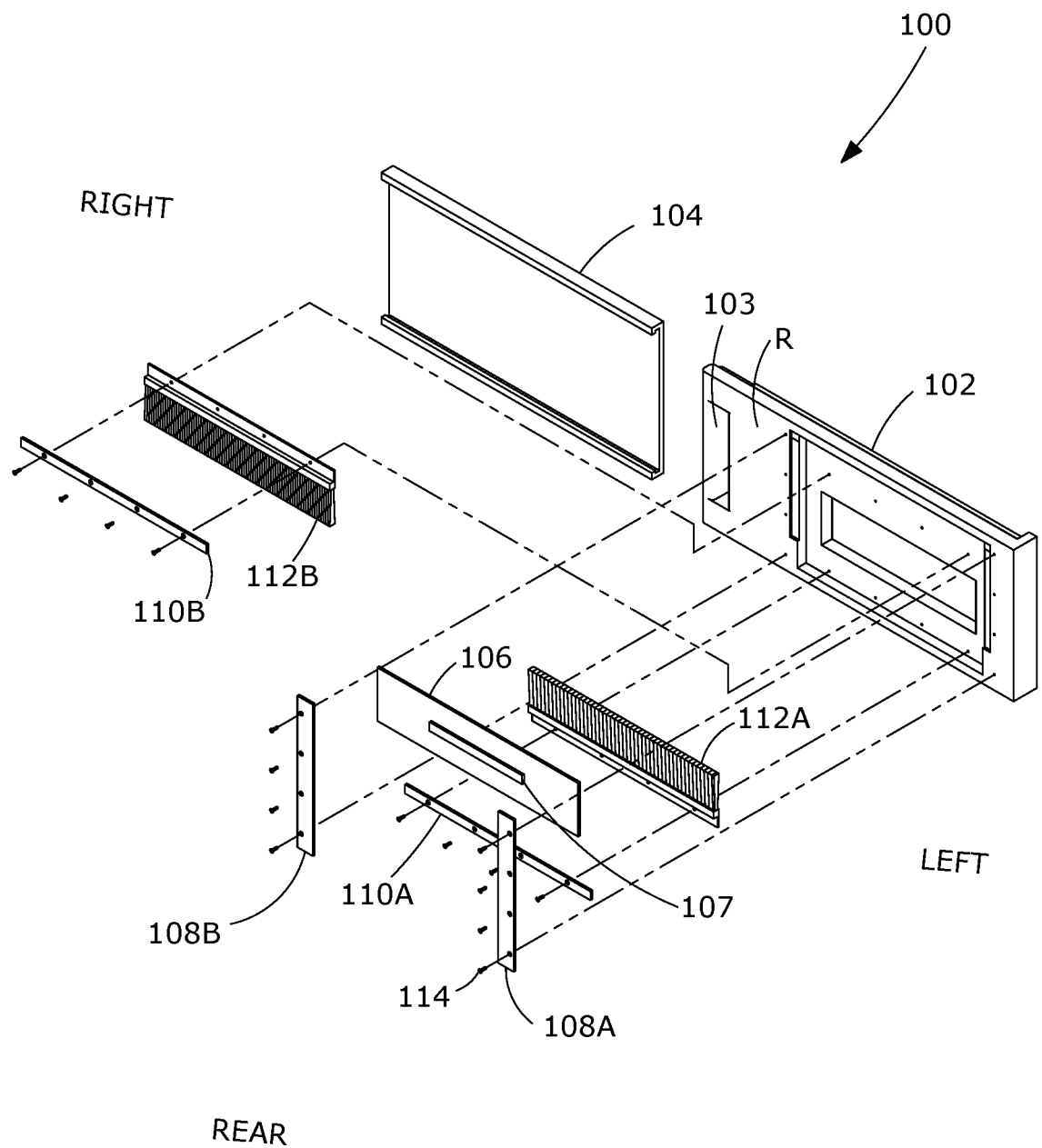
FIG. 10—An exploded rear perspective view of the portable window insert 100 depicted in FIGS. 1-9 showing all the elements thereof.

Referring for example, to FIGS. 9 and 10, the first embodiment of the portable window insert 100 of this invention comprises a main panel 102. The main panel 102 has a front face F, a rear face R, an upper edge U, an opposed lower edge L, a first or right side edge RT and an opposed second or left side edge LT. A pass-through opening 101 is provided through which the utility lines pass 116, 118, 120, see FIGS. 3 and 4.

Figure 1:
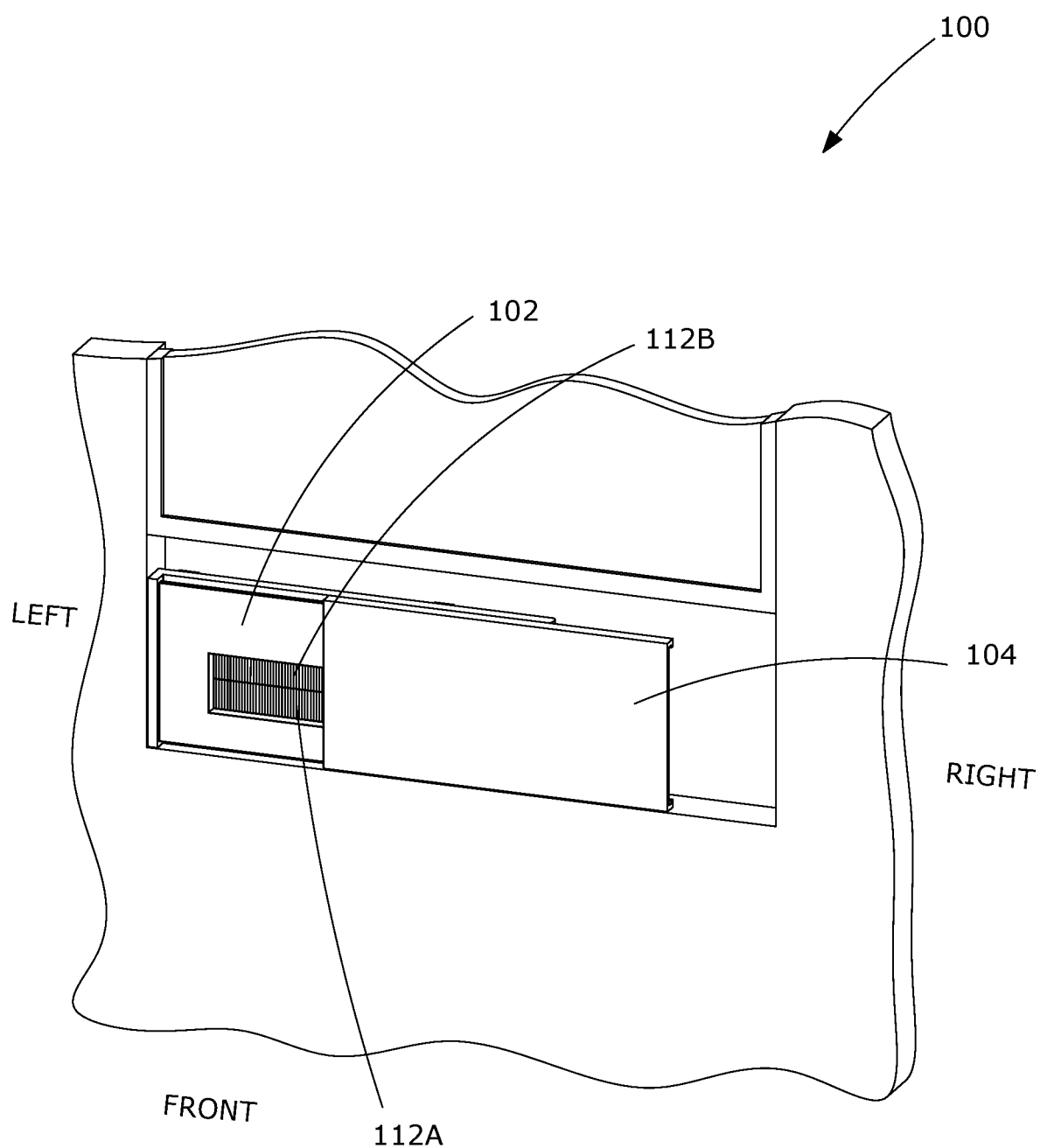
FIG. 1—A front perspective view of an embodiment of the portable window insert 100 placed in a partially opened window with the slider 104 partially extended.
Figure 2:
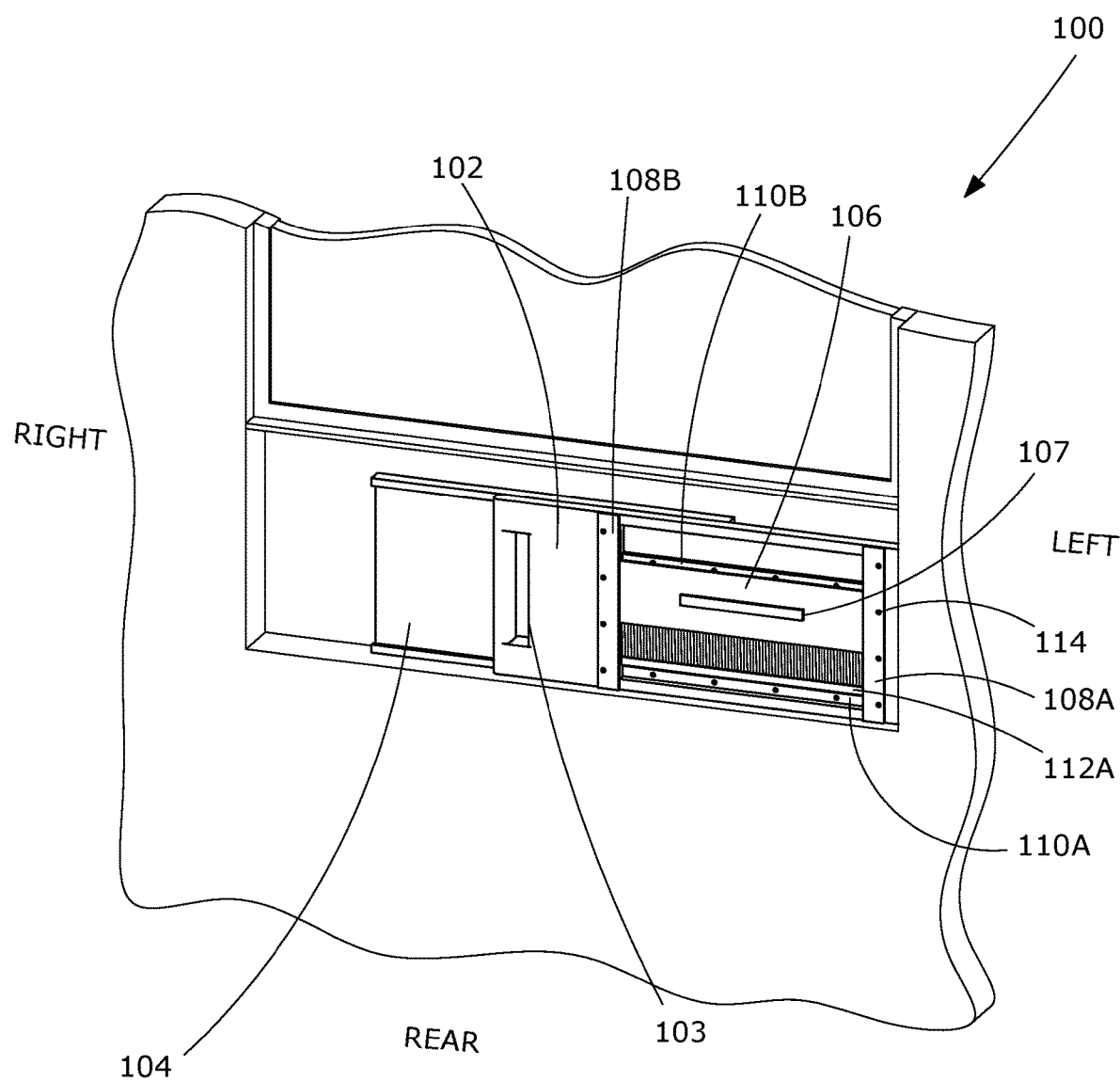
FIG. 2—The rear perspective view of the embodiment of the portable window insert depicted 100 in FIG. 1 in the partially opened window with the slider 104 partially extended.
Figure 3:
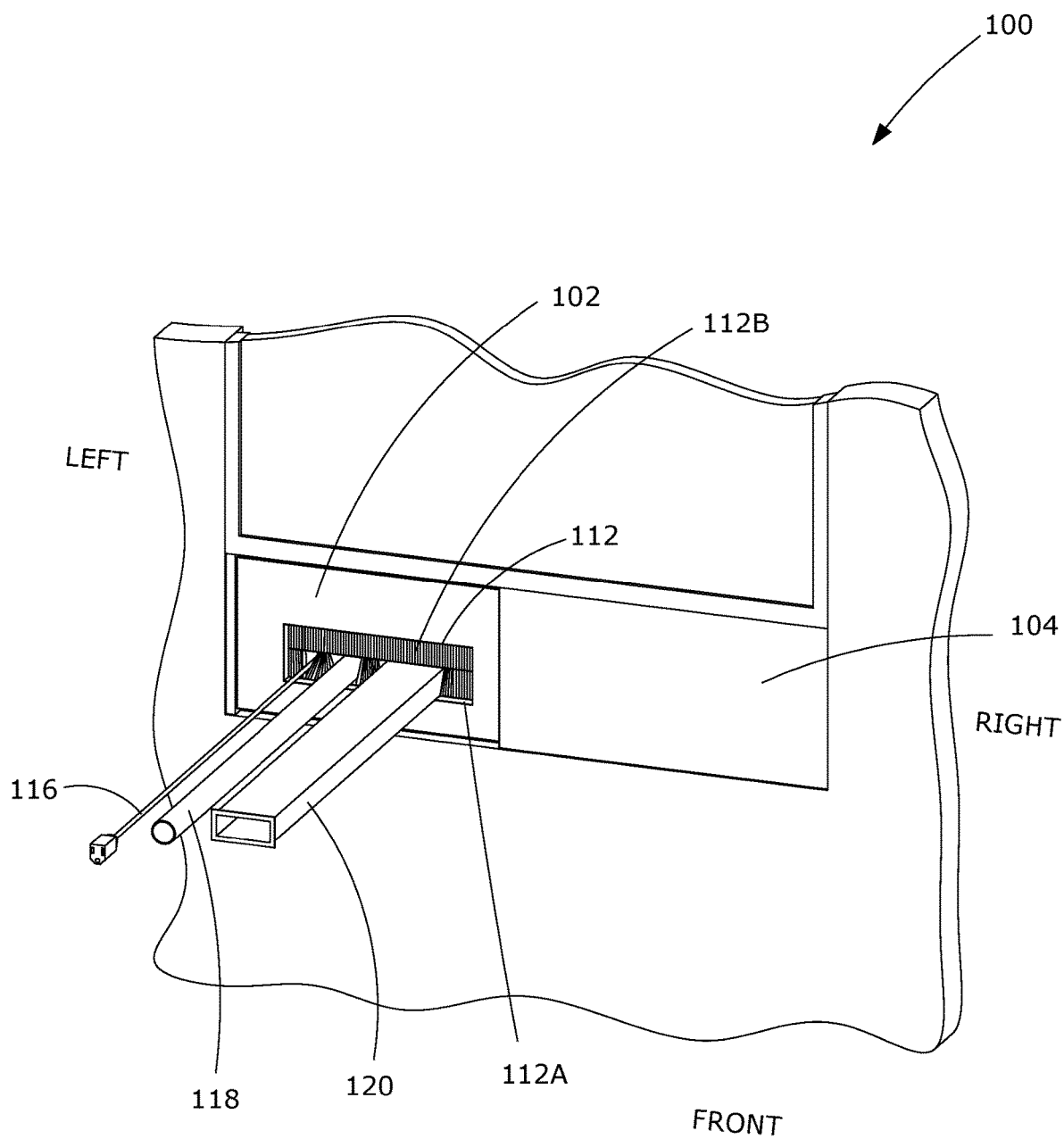
Figure 4:
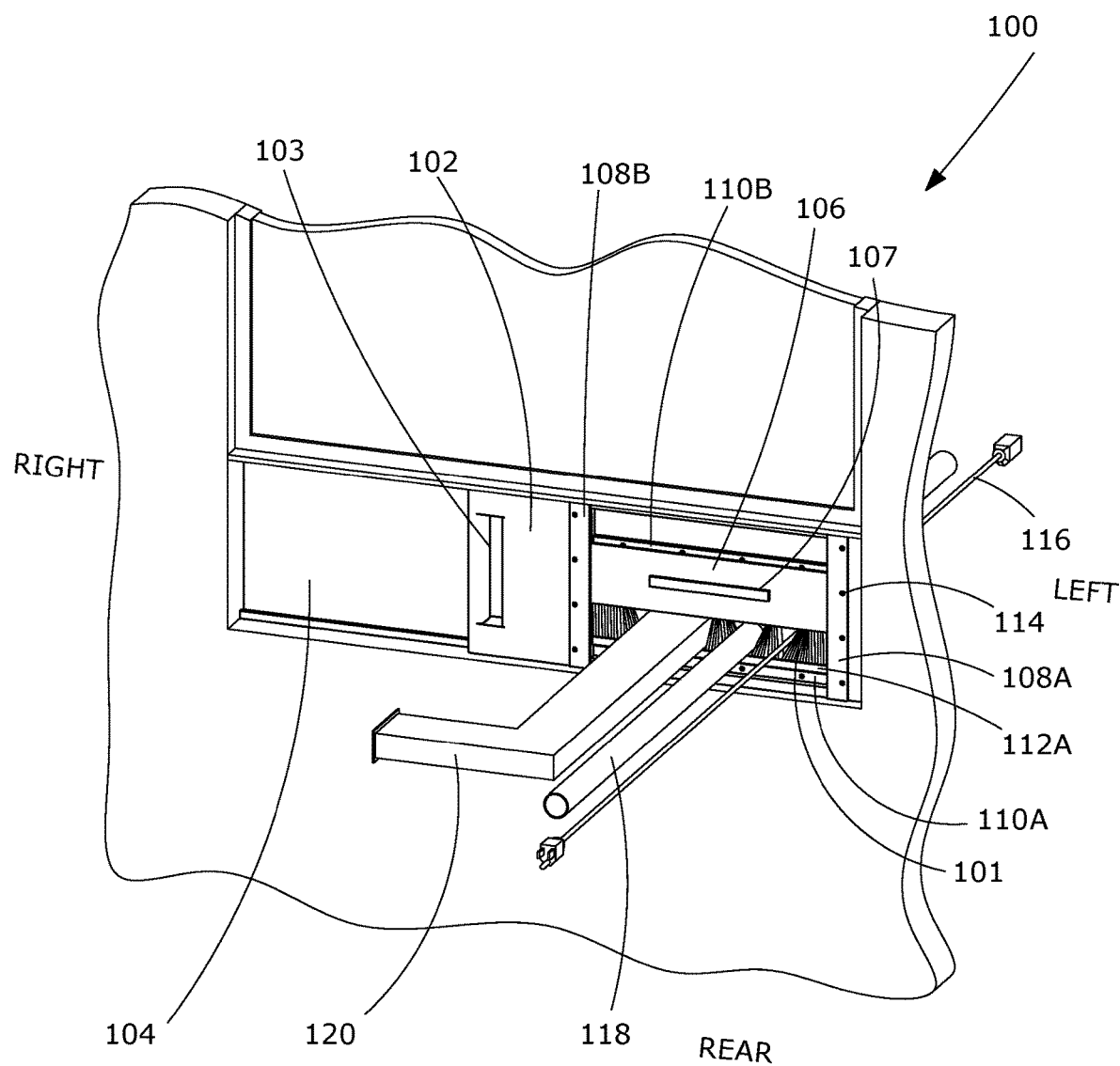

Still referring to FIGS. 3 and 4, it is envisioned that any type utility can be transferred by passing a utility line through the pass-through opening 101. For example, electric cable line 116 can carry electricity, telephone signals, internet signals, etc., tube 118 can pass water, gas, such as oxygen, acetylene, etc. or even several electric cables, and 120 can pass hot air, cool air, etc.

Still referring for example FIGS. 9 and 10, the main panel 102 also includes a handhold opening 103 proximate the first or right edge RT of the main panel 102. A slider panel 104 is provided that has an upper edge U, an opposed lower edge L, a first or right side edge RT and an opposed second or left side edge LT. Referring to FIG. 12, which is a cross-sectional view of the portable window insert 100 taken along line 12-12 of FIG. 6., the upper U and lower edges L of the main panel 102 and the slider panel 104 edges U, L are slidably engaged with each other on the front face F of the main panel 102. The slider panel 104 may be selectively positioned to a retracted position, see FIGS. 5,7 and 11 or to an extended position, see FIGS. 3, 4, 6, and 8.

Referring for example to FIGS. 3, 9 and 10 a flexible sealing member, generally 112, is mounted to the rear face R of the main panel 102 and surrounds the pass-through opening 101. The sealing member 112 permits the passage of the utility lines 116, 118, 120 through the pass-through opening 101 and substantially surrounds such lines 116, 118, 120 to inhibit the passage of air through the pass-through opening 101.

The sealing member 112 can be made of and structured in any manner that permits the utility lines, e.g., 116, 118 and 120, to pass through the pass-through opening 101 while surrounding and adequately sealing the opening 101 to the passage of air there through. Referring to FIGS. 9 and 10, a preferred sealing member 112 consists of a lower brush member 112A and an upper brush member 112B mounted to the rear face 102R of the main panel 102 by lower holding plate 110A and upper holding plate 110B and several screws 114 that pass through the holding plates 110a, 110B and lower and upper brush members 112A, 112B to mount them on the rear face R of the main panel 102. Alternatively, a rubber grommet (not shown) surrounding the pass-through opening 101 may be used as a sealing member 112.

Figure 7:
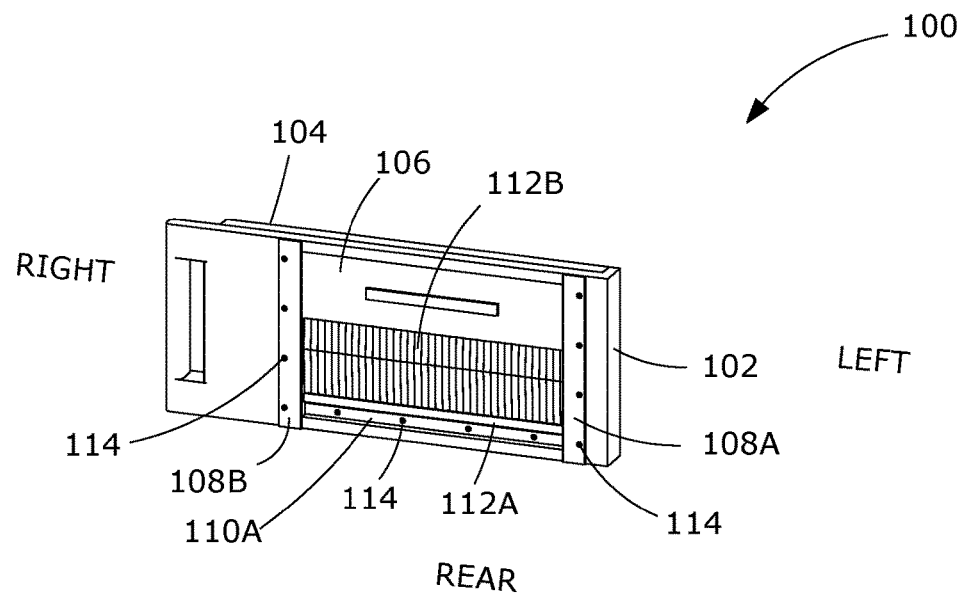
FIG. 7—A rear perspective view of the portable window insert 100 depicted in FIGS. 1-6 collapsed for easy transport by the user.
Figure 8:
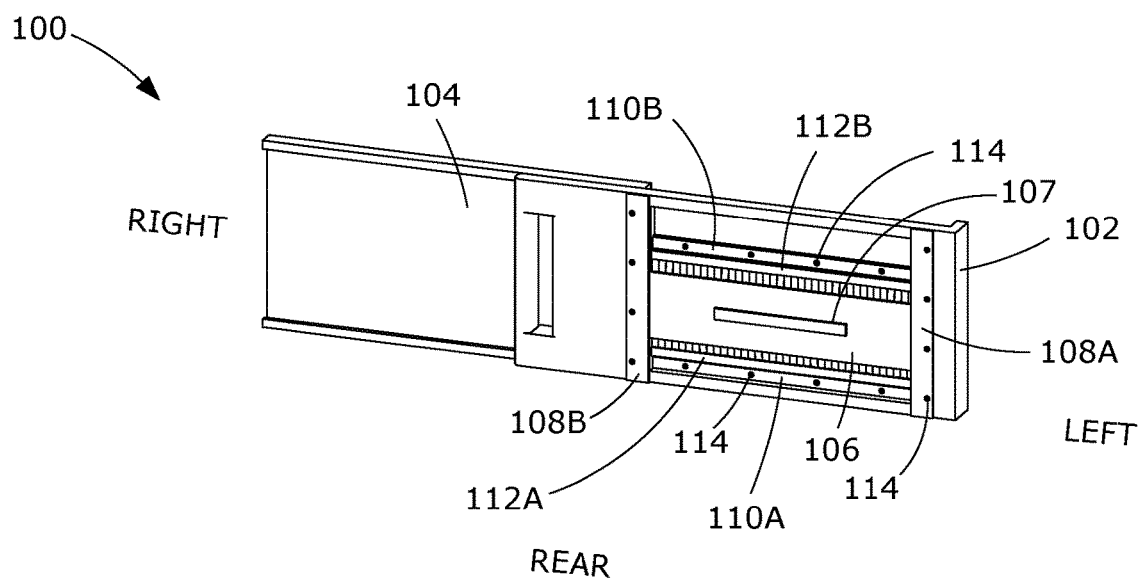
FIG. 8—A rear perspective view of the portable window insert 100 depicted in FIGS. 1-7 extended for use (window not shown).

Referring to FIGS. 2, 4, 7, 8, 9 and 10 a sealing panel 106 is slidably mounted to the rear face R of the main panel 102. The sealing panel 106 can be selectively positioned to cover the pass-through opening 101 either partially (as shown in FIG. 4) or completely (as shown in FIG. 8) or to uncover or expose the pass-through 101 opening (as shown in FIG. 7).

As shown in FIGS. 9 and 10, a preferred mounting means for the sealing panel 106 consists of guide plates 108A and 108B mounted to the rear face R of the main panel 102 on either side of the pass-through opening 101 by several screws 114 that pass through the guide plates 108A, 108B. Sufficient space is left between the rear face R of the main panel 102 and the guide plates 108A and 108B to permit the sealing panel 106 to slide there between. As shown in FIGS. 2, 4, 8, and 10 the rear of the sealing panel 106 has a grip member 107 which permits the user to raise or lower the panel 106, i.e., selectively position the panel 106 to cover the pass-through opening 101 either partially or completely or to uncover or expose the pass-through 101 opening.

Figure 5:
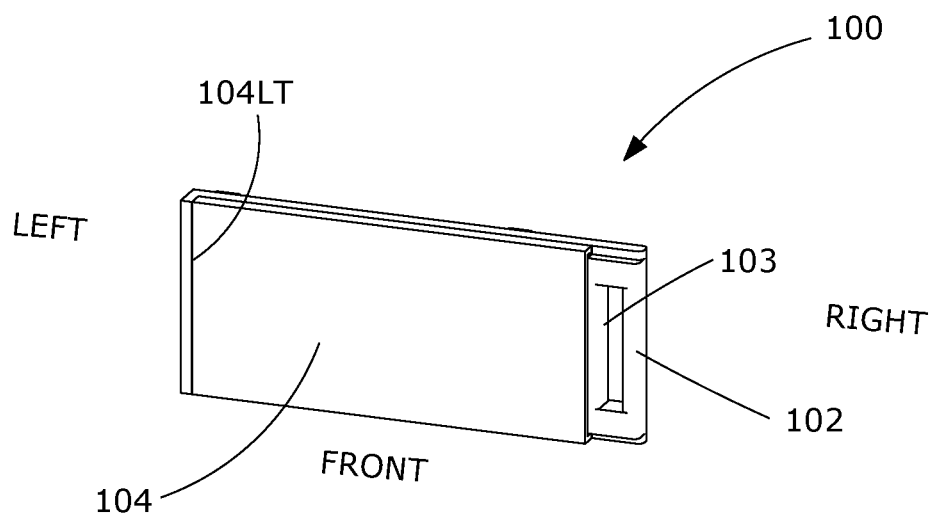
FIG. 5—A front perspective view of the portable window insert 100 depicted in FIGS. 1-4 collapsed for easy transport by the user.
Figure 6:
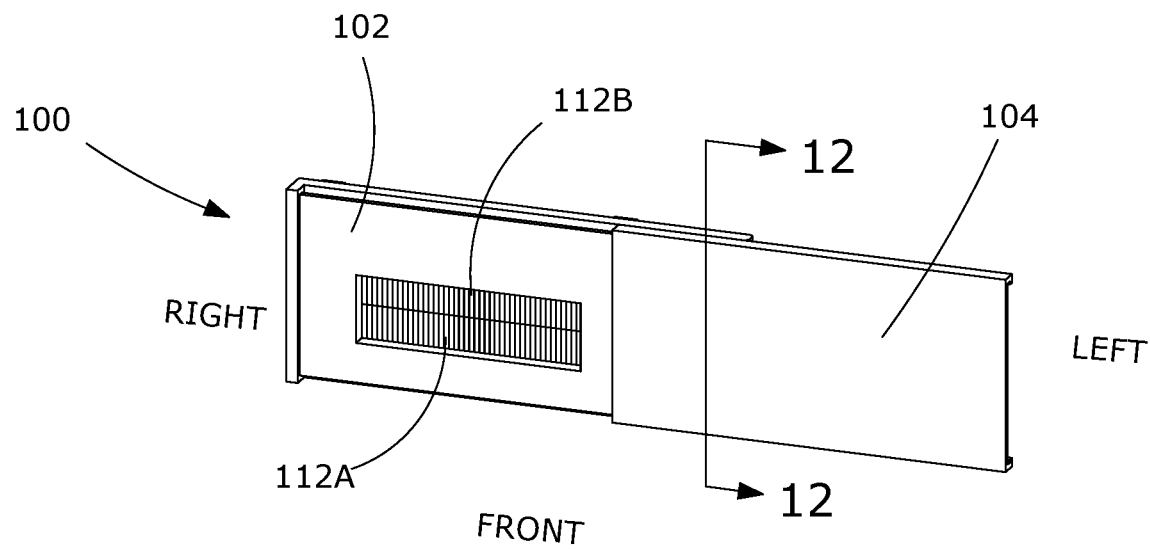
FIG. 6—A front perspective view of the portable window insert 100 depicted in FIGS. 1-5 extended for use (window not shown).
Figure 11:
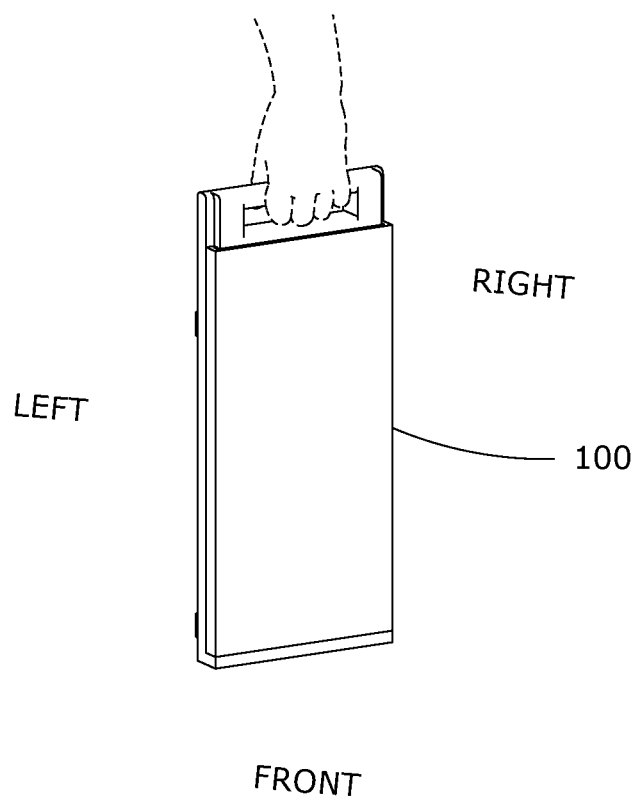
FIG. 11—A front perspective view of the portable window insert 100 depicted in FIGS. 1-10 collapsed and being transported by the user.
Figure 12:
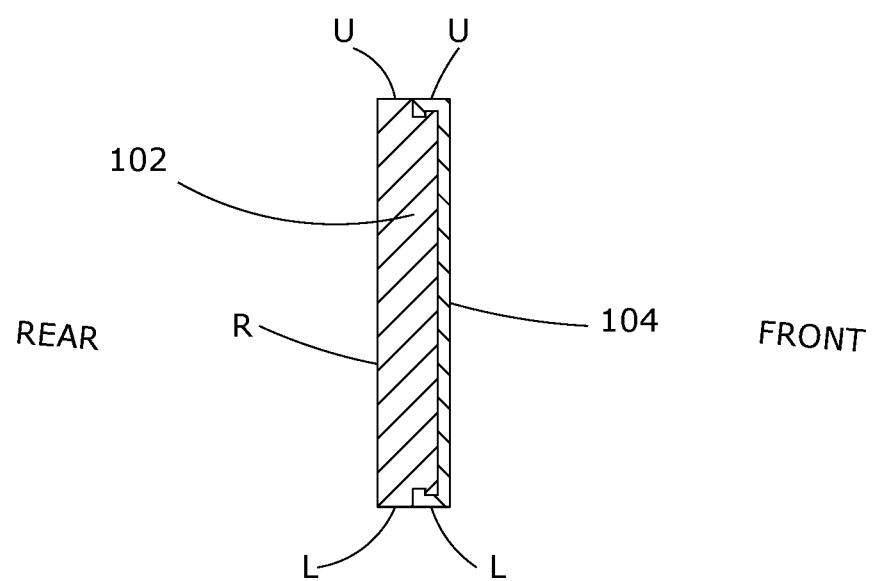
FIG. 12—A cross-sectional view of the portable window insert 100 of this invention taken along line 12-12 of FIG. 6.

As depicted in FIGS. 5, 7, and 11 when the slider panel 104 is in the retracted position the second or left edge LT of the slider panel 104 is aligned with the second or left edge LT of the main panel 102, the pass-through opening 101 is covered by the slider panel 104 and the hand hold 103 is exposed for use permitting a user to carry the portable window insert 100 by grasping the hand hold opening 103 (see FIG. 11).

Referring to FIGS. 1-4, in use the main panel 102 lower edge L is positioned to rest on the bottom sill of the window, the slider panel 104 is in the extended position with the second edge or left edge LT of the main panel 102 abutting one of the sides of the window opening and the first edge or right edge RT of the slider panel 104 abutting the other side of the window opening, whereby the portable window insert 100 is securely lodged in the window opening and the pass-through opening 101 is exposed for use. The sealing panel 106 may be selectively positioned to cover the pass-through opening 101 to inhibit the passage of air and utility lines there through or to uncover or expose the pass-through opening 101 to permit the passage of utility lines there through.

The first embodiment 100 (FIGS. 1-12) is the least expensive and simplest embodiment described herein and is used to pass extension cables, HVAC vents, water and gas pipes/lines, electric from an outside generator, 116, 118, 120 as well as any other utilities that need to be run through a window temporarily through the pass-through hole 101 therein. The brushes 112A, 112B and sealing member 106 prevent the passage of air from passing through the pass-through hole 101 as well as prevent insects and other outside objects from entering the building. The back slider 106 can be used to completely seal off the pass-through opening 101 when there is no need for any utilities to pass through the window.

First Embodiment

Sub-Embodiment

Referring now to FIGS. 36-38, a sub-embodiment of the First Embodiment of this invention, in which like numerals represent like elements throughout the First Embodiment, the portable window insert 100 of this invention comprises a main panel 102. A pass-through opening 101 is provided through which the utility lines pass. The main panel 102 also includes a handhold opening 103 proximate an edge of the main panel 102. A slider panel 104 is provided that is slidably engaged with the main panel 102. The slider panel 104 may be selectively positioned to a retracted position, see FIG. 36 or to an extended position, see FIGS. 37 and 38.

A flexible sealing member is mounted to the rear face of the main panel 102 and surrounds the pass-through opening 101. The sealing member permits the passage of the utility lines through the pass-through opening 101 and substantially surrounds such lines to inhibit the passage of air through the pass-through opening 101.

As depicted in FIG. 36 when the slider panel 104 is in the retracted position the pass-through opening 101 is covered by the slider panel 104 and the hand hold 103 is exposed for use permitting a user to carry the portable window insert 100 by grasping the hand hold opening 103.

This sub-embodiment is additionally provided with a locking switch 125 which can be selectively moved to lock the slider panel 104 in a locked position on main panel 102 or to unlock the slider panel 104 to permit it to slide along the main panel 102 so that slider panel 104 may be selectively positioned and locked in a retracted position, see FIG. 36 or in an extended position, see FIGS. 37 and 38.

In use the main panel 102 lower edge is positioned to rest on the bottom sill of the window, the slider panel 104 is in the extended position with the left edge of the main panel 102 abutting one of the sides of the window opening and the right edge of the slider panel 104 abutting the other side of the window opening, whereby the portable window insert 100 is securely lodged in the window opening and the pass-through opening 101 is exposed for use.

Second Embodiment

Referring now to the drawings, in which like numerals represent like elements throughout the several views, FIGS. 13-25 depict the Second Embodiment of the portable window insert 200 of this invention.

Referring for example to FIGS. 21 and 22, the second embodiment of the portable window insert 200 of this invention provides for the temporary distribution of electrical signals, for example, electricity, internet signals, telephone signals, cable television, etc. through a window opening. The portable window insert 200 comprises a main panel 202 having a front face F, a rear face R, an upper edge U, an opposed lower edge L, a first or right side edge R and an opposed second or left side edge LT. The main panel 202 also includes a handhold opening 203 proximate the first or right edge RT of main panel 202. Preferably, the electrical signal receptacle is an electrical receptacle 210 for the transmission of electricity and is mounted on the front face F of the main panel 202 proximate the second side or left edge LT of the main panel 202. The receptacle 210 is mounted in a receptacle enclosure 211 which has a receptacle back plate 206 mounted to the main panel 202 rear face R. The receptacle 210 further has a receptacle cover 212 for safety and to protect the receptacle 210. All these elements are kept in place by a number of screws 216. Preferably, this embodiment has a 15 Amp GCFI safety outlet/receptacle 210 which protects the user's home and electronics from damage in the event of a short.

It should be understood that by the use of the term "electrical signal receptacle" it is meant to include not only receptacles for the transmission of electricity but other type receptacles, for example, receptacles for cable TV, internet signal, telephone signals, and combinations of these signals in one receptacle.

Still referring for example to FIGS. 21 and 22, a slider panel 204 is provided that has an upper edge U, an opposed lower edge L, a first or right side edge RT and an opposed second or left side edge LT. Referring to FIG. 25, which is a cross-sectional view of the portable window insert 200 taken along line 25-25 of FIG. 19, the upper U and lower edges L of the main panel 202 and the slider panel 204 edges U, L are slidably engaged with each other on the front face F of the main panel 202. The slider panel 204 may be selectively positioned to a retracted position, see FIGS. 17, 19, 23, and 24, or to an extended position, see FIGS. 15, 16, 18, and 20.

Referring to FIGS. 14, 16, 19, 20, 22 and 24 an electrical cable projects through the rear face R of the main panel 202, one end 223 of the cable 222 in electrical communication with the electrical receptacle 210, i.e., "hard wired" to the receptacle 210 and the other end has an electrical plug 224 thereon. A cable storage compartment 207 is located on the rear face R of the main panel 202 for removably storing the cable 222 and plug 224 therein. Within the cable storage compartment 207 are two posts 208 secured therein by screws 216 on which the cable 222 may be wrapped around for storage. Secured to the bottom of the compartment 207 is a hook and loop member 218 secured by a screw 214 that can be wrapped around the cable 222 to secure it therein.

Referring to FIGS. 17, 19, 23, and 24, when the slider panel 204 is in the retracted position the second or left edge LT of the slider panel 204 abuts the electrical receptacle 210 mounted on the front face F of the main panel 202 and the hand hold 203 is exposed by the slider panel 204 permitting a user to carry the portable window insert 200 by grasping the hand hold 203.

Referring to FIGS. 13-16, in use the main panel 202 lower edge L is positioned to rest on the bottom sill, the slider panel 204 is in the extended position, see FIG. 15, with the second or left edge L of the main panel abutting one of the sides of the window opening and the first or right edge RT of the slider panel 204 abuts the other side of the window opening to secure the portable window insert 200 in the window opening.

The second embodiment of the portable window insert 200 (FIGS. 13-25) is an intermediate priced portable window insert 200. This embodiment does not permit the passage of utility cables and tubes to pass directly through the window. This embodiment permits users to provide power or other electrical signals from inside for external use, e.g., power tools, Christmas lights, spot lights, air pumps, as well as other items that require power to be used outside. This can be reversed, if for example, a generator is used to provide power for the interior of the room. This second embodiment of portable window insert 200 provides a drastic reduction in draft seeping in from the outside while providing the necessary power to the interior (or vice versa) as it has no holes or gaps in the insert.

Second Embodiment

Sub-Embodiment

Referring now to FIGS. 39-41, a sub-embodiment of the Second Embodiment of this invention, in which like numerals represent like elements throughout the Second Embodiment, the portable window insert 200 of this invention provides for the temporary distribution of electrical signals, for example, electricity, internet signals, telephone signals, cable television, etc. through a window opening. The portable window insert 200 comprises a main panel 202. The main panel 202 also includes a handhold 203 mounted on the rear face of main panel 202. Preferably, the electrical signal receptacle is an electrical receptacle 210 for the transmission of electricity and is mounted on the front face of the main panel 202 proximate the left edge of the main panel 202. The receptacle 210 further has a receptacle cover 212 for safety and to protect the receptacle 210.

A slider panel 204 is provided that is slidably engaged with the main panel 202. The slider panel 204 may be selectively positioned to a retracted position, i.e., FIG. 39, or to an extended position, FIGS. 40 and 41.

Referring to FIG. 41 an electrical cable projects through the rear face of the main panel 202 that is in electrical communication with the electrical receptacle 210, i.e., "hard wired" to the receptacle 210 and the other end has an electrical plug thereon. A cable storage compartment 207 is located on the rear face of the main panel 202 for removably storing the cable and plug therein. Within the cable storage compartment 207 are the handle 213 and two posts 208 on which the cable may be wrapped around for storage.

Referring to FIG. 39, when the slider panel 204 is in the retracted position the left edge of the slider panel 204 abuts the electrical receptacle 210 mounted on the front face of the main panel 202. The hand hold 203 may be then be held by the user to carry the portable window insert 200 by grasping the hand hold 203.

In use the main panel 202 lower edge is positioned to rest on the bottom sill, the slider panel 204 is in the extended position, with the left edge of the main panel abutting one of the sides of the window opening and the right edge of the slider panel 204 abuts the other side of the window opening to secure the portable window insert 200 in the window opening. The window insert may be positioned in the window by the user by grasping the hand hold 203.

Third Embodiment

Referring now to the drawings, in which like numerals represent like elements throughout the several views, FIGS. 26-35 depict the Third Embodiment of the portable window insert 300 of this invention.

Referring for example to FIGS. 32 and 33, the third embodiment of the portable window insert 300 of this invention provides for the temporary distribution of electrical signals, for example, electricity, internet signals, telephone signals, cable television, etc. through a window opening. The portable window insert 300 comprises a main body 302 having a front face F, a rear face R, an upper face U, an opposed lower face L, a right side face RT and an opposed left side face LT.

Still referring for example to FIGS. 32 and 33, there is at least one electrical receptacle, and preferably two electrical receptacles 318A and 318B mounted on the front face F of the main body 302. Referring to FIG. 33, an electrical insert receptacle 314 is mounted on the rear face R of the main body 302 and is in electrical communication with the electrical receptacles 318A and 318B mounted on the front face F of the main body 302.

Preferably the electrical signal receptacle 318A, 318B is an electrical receptacle 318 for the transmission of electricity. A 15 Amp GCFI safety outlet/receptacle 318A, 318B is preferred. This rated receptacle protects the user's home and electronics from damage in the event of a short.

The receptacles 318A, 318B are mounted in receptacle enclosures 319A and 319B, which has a receptacle back plate 304 mounted to the main body 302 rear face R securing the receptacles 318A, 318B in the receptacle enclosures 319A, 319B. Each receptacle 318A, 318B has a receptacle cover 316A, 316B for safety and to protect the receptacle 318A, 318B. All these elements are kept in place by a number of screws 326.

It should be understood that by the use of the term "electrical signal receptacle" it is meant to include not only receptacles for the transmission of electricity but other type receptacles, for example, receptacles for cable TV, internet signal, telephone signals, and combinations of these signals in one receptacle.

Still referring to FIGS. 32 and 33, a right wing member 306A and a left wing member 306B are provided. Each of these wing members, 306A, 306B, each have a front face F, a rear face R, an upper face U, an opposed lower face L, a right side face RT and an opposed left side face LT. The right side face RT of the left wing member 306B is hingedly mounted 320B to the left side face LT of the main body 302 and the left side face LT of the right wing member 306A is hingedly mounted 320A to the right side face 302RT of the main body 302. Referring to FIGS. 26-31, 34 and 35, each wing member 306A, 306B can be selectively pivoted to i) a closed position wherein the rear face R of each wing member 306A, 306B overlays the rear face R of the main body 302, e.g. see FIGS. 34, 35, in particular the back plate 304 or ii) an open position wherein the rear face R of each wing member body 306A, 306B is coplanar with the rear face R or back plate 304 of the main body 302, see FIGS. 28, 29.

Referring to FIGS. 31, 33, each wing member 306A, 306B is maintained in the closed position with the rear face R of each wing member 306A, 306B overlaying the rear face R of the main body 302, by a magnetic latch 330A, 330B mounted on the rear face R of the wing member 306A, 306B and the rear face R (back plate 304) of the main body 302.

Referring to FIGS. 30-33, a right slider panel 308A is provided having a right side edge RT and an opposed left side edge LT slidably engaged with the right wing member 306A. The slider panel 308A may be selectively positioned to i) an extended position wherein the right slider panel 308A extends from the right side face RT of the right wing member 306A, or ii) a retracted position wherein the right edge RT of the right slider panel 308A is flush with the right side edge RT of the right wing member 306A.

Still referring to FIGS. 30-33, a left slider panel 308B is provided having a right side edge RT and an opposed left side edge LT slidably engaged with the left wing member 306B. The slider panel 308B may be selectively positioned to i) an extended position wherein the left slider panel 308B extends from the left side face LT of the left wing member 306B, or ii) a retracted position wherein the left edge LT of the left slider panel 308B is flush with the left side edge LT of the left wing member 306A.

Referring to FIGS. 26-29, in use the lower face L of the main body 302 is positioned to rest on the bottom sill of the window, the right and left wing members 306A, 306B are in the open position and the right edge R of the right slider panel 308A is in the extended position abutting one side of the window opening and the left edge L of the left slider panel 308B is in the extended position abutting the other side of the window opening, thus securing the portable window insert 300 in the window opening. When the portable window insert 300 is not in use in the window opening, the right and left slider panels 308A, 308B are in the retracted position and the right and left wing members 306A, 306B are in the closed position.

Referring to FIG. 35, preferably there is an access hole 336 provided through the wings 306A and sliders 308 to permit the use of the receptacles 318A, 318B and electrical insert receptacle 314 while the portable window insert 300 is in the closed position as depicted in FIGS. 34 and 35.

The third embodiment of the portable window insert 300 (FIGS. 26-35) has numerous benefits. This embodiment permits the user to provide power or other electrical signals from inside for external use or from outside for internal use. In its preferred mode, when not inserted in the window, i.e., not extended, this embodiment permits the user to use the two receptacles 318A, 318B outlets. For example, the portable window insert 300 can be placed on a work table or directly on the ground without worry that it will topple over. Alternatively, the portable window insert 300 may be unfolded (see FIG. 28) to place the device directly in the window. Referring to FIG. 29, this embodiment may also be provided with a removable cable 332 rather than a permanent hard wired power cable for easy replacement if the cable should get damaged or could use a longer or shorter cable.

Third Embodiment

Sub-Embodiment

Referring now to FIGS. 42-47, a sub-embodiment of the Third Embodiment of this invention, in which like numerals represent like elements throughout the Third Embodiment, the portable window insert 300 of this invention provides for the temporary distribution of electrical signals, for example, electricity, internet signals, telephone signals, cable television, etc. through a window opening. The portable window insert 300 comprises a main body 302.

Referring to FIG. 44, there is at least one electrical receptacle, and preferably two electrical receptacles 318A and 318B mounted on the front face of the main body 302. Referring to FIG. 46, an electrical insert receptacle 314 is mounted on the rear face of the main body 302 and is in electrical communication with the electrical receptacles 318A and 318B mounted on the front face of the main body 302.

Preferably the electrical signal receptacle 318A, 318B is an electrical receptacle 318 for the transmission of electricity. Each receptacle 318A, 318B has a receptacle cover 316A, 316B for safety and to protect the receptacle 318A, 318B.

Referring to FIGS. 42-47, a right wing member 306A and a left wing member 306B are provided. Referring to FIGS. 44 and 46, the right side face of the left wing member 306B is hingedly mounted 320B to the left side face of the main body 302 and the left side face of the right wing member 306A is hingedly mounted 320A to the right side face of the main body 302. Each wing member 306A, 306B can be selectively pivoted to i) a closed position wherein the rear face of each wing member 306A, 306B overlays the rear face of the main body 302, e.g. see FIGS. 42, 45, in particular the back plate 304 or ii) an open position wherein the rear face of each wing member body 306A, 306B is coplanar with the rear face or back plate 304 of the main body 302, see FIGS. 46 and 47.

Referring to FIGS. 45, 46, each wing member 306A, 306B is maintained in the closed position with the rear face of each wing member 306A, 306B overlaying the rear face of the main body 302, by a mechanical latch 330A, 330B mounted on the rear face of the main body 302 that mates with a latch holder on the wing members 308A, 308B.

Referring to FIGS. 44 and also 47, a right slider panel 308A is provided that slidably engages with the right wing member 306A. The slider panel 308A may be selectively positioned to i) an extended position wherein the right slider panel 308A extends from the right side face of the right wing member 306A, or ii) a retracted position, see FIG. 43, wherein the right edge of the right slider panel 308A is flush with the right side edge of the right wing member 306A.

Still referring to FIGS. 44 and also 47, a left slider panel 308B is provided that slidably engages with the left wing member 306B. The slider panel 308B may be selectively positioned to i) an extended position wherein the left slider panel 308B extends from the left side face of the left wing member 306B, or ii) a retracted position, see FIG. 43, wherein the left edge of the left slider panel 308B is flush with the left side edge of the left wing member 306A.

In use the lower face of the main body 302 is positioned to rest on the bottom sill of the window, the right and left wing members 306A, 306B are in the open position and the right edge of the right slider panel 308A is in the extended position abutting one side of the window opening and the left edge of the left slider panel 308B is in the extended position abutting the other side of the window opening, thus securing the portable window insert 300 in the window opening. When the portable window insert 300 is not in use in the window opening, the right and left slider panels 308A, 308B are in the retracted position and the right and left wing members 306A, 306B are in the closed position. Referring to FIG. 45, preferably there is access to the electrical the insert receptacle 314 between the wings 306 and sliders 308 to permit the use of the receptacles 318A, 318B while the portable window insert 300 is in the closed position.

Each of the three embodiments of the portable window inserts of this invention, 100, 200, 300 serve varying functional and marketing needs.

Generally, depending on the embodiment used herein, the window insert is opened and expanded and placed, for example in the lower seat of the open window frame, the window panel is then closed upon the upper surface, and adjustable panel sliders, e.g., 104, 204, 308A, 308B are extended laterally to seal the window insert, 100, 200, 300 within the window. Although the window insert has been described as used in a horizontal position, with the window panel being lowered, the invention may also be used in the upper portion of the window with the window panel being raised, or may also be used in the vertical position with the window panel being slid to the left or to the right.

The window insert prevents loss of heat, loss of cool air and seals the window to prevent intrusion of moisture, humidity, outdoor pollens, rain, snow and other unwanted outdoor elements from entry through the window while permitting the distribution of utilities from the outside into the interior of from the interior to the outside.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

The invention claimed is:

1. A combination portable window insert and window opening, the window opening, comprising a bottom sill, a bottom of a raised window panel and opposed sides,
the insert comprising:
a main panel having an upper edge, an opposed lower edge, a first side edge and an opposed second side edge, and a handhold opening proximate the first side edge of the main panel;
an electrical signal receptacle mounted on the main panel;
a cable projecting from the main panel in electrical communication with the electrical signal receptacle;
a cable storage compartment in the main panel for removably storing the cable;
a slider panel having an upper edge, an opposed lower edge, a first side edge and an opposed second side edge, wherein the upper and lower edges of the main panel and the upper and lower edges of the slider panel slidably engage with each other and the slider panel is selectively positioned to a retracted position and to an extended position;
wherein when the slider panel is in the extended position to insert the portable window insert in the window opening, the electrical signal receptacle, the cable and the cable storage compartment are exposed for use and the handhold opening is covered by the slider panel, the main panel lower edge and slider panel lower edge rests on the bottom sill, the second side edge of the main panel abuts one of the sides of the window opening and the first side edge of the slider panel abuts the other side of the window opening, and the main panel upper edge and slider panel upper edge abut the bottom of the raised window panel to securely lodge the portable window insert in the window opening; and
wherein when the slider panel is in the retracted position the handhold opening proximate the first edge of the main panel is exposed for use.

2. A combination portable window insert and window opening, the window opening, comprising a bottom sill, a bottom of a raised window panel and opposed sides,
the insert comprising:
a main panel having a front face, a rear face an upper edge, an opposed lower edge, a first side edge and, an opposed, second side edge, and, a handhold opening proximate the first side edge of the main panel;
an electrical signal receptacle mounted on the front face of the main panel proximate the second side edge of the main panel;
a cable projecting through the rear face of the main panel, one end of the cable in electrical communication with the electrical signal receptacle, and the other end having an electrical plug;
a cable storage compartment in the rear face of the main panel for removably storing the cable and plug projecting from the rear face;
a slider panel having an upper edge, an opposed lower edge, a first side edge and an opposed second side edge, wherein the upper and lower edges of the main panel and the upper and lower edges of the slider panel slidably engage with each other on the front face of the main panel, and the slider panel is selectively positioned to a retracted position and to an extended position;
wherein when the slider panel is in the extended position to insert the portable window insert in the window opening, the electrical signal receptacle, the cable and the cable storage compartment are exposed for use and the handhold opening is covered by the slider panel, the main panel lower edge and slider panel lower edge rests on the bottom sill, the second side edge of the main panel abuts one of the sides of the window opening and the first side edge of the slider panel abuts the other side of the window opening, and the main panel upper edge and slider panel upper edge abut the bottom of the raised window panel to securely lodge the portable window insert in the window opening; and
wherein when the slider panel is in the retracted position the handhold opening proximate the first edge of the main panel is exposed for use.

3. The combination portable window insert and window opening of claim 2, wherein the electrical signal receptacle is an electrical receptacle for electricity.

4. A portable window insert, the window insert comprising:
a main panel having an upper edge, an opposed lower edge, a first side edge and an opposed second side edge, and a handhold opening proximate the first side edge of the main panel;
an electrical signal receptacle mounted on the main panel;
a cable projecting from the main panel in electrical communication with the electrical signal receptacle;
a cable storage compartment in the main panel for removably storing the cable;
a slider panel having an upper edge, an opposed lower edge, a first side edge and an opposed second side edge, wherein the upper and lower edges of the main panel and the upper and lower edges of the slider panel slidably engage with each other and the slider panel is selectively positioned to a retracted position and to an extended position;

wherein when the slider panel is in the extended position, the electrical signal, receptacle, the cable and the cable storage compartment are exposed for use and the handhold opening is covered by the slider panel; and wherein when the slider panel is in the retracted position the handhold opening proximate the first side edge of the main panel is exposed for use.

5. A portable window insert, the window insert comprising:

a main panel having a front face, a rear face, an upper edge, an opposed lower edge, a first side edge and an opposed second side edge, and a handhold opening proximate the first side edge of the main panel;

an electrical signal receptacle mounted on the front face of the main panel;

a cable projecting through the rear face of the main panel, one end of the cable in electrical communication with the electrical signal receptacle and the other end having an electrical plug;

a cable storage compartment in the rear face of the main panel for removably storing the cable and plug projecting from the rear face;

a slider panel having an upper edge, an opposed lower edge, a first side edge and an opposed second side edge, wherein the upper and lower edges of the main panel and the upper and lower edges of the slider panel slidably engage, with each other on the front face of the main panel, and the slider panel is selectively positioned to a retracted position and to an extended position;

wherein when the slider panel is in the extended position, the electrical signal receptacle, the cable and the cable storage compartment are exposed for use and the handhold opening is covered by the slider panel; and wherein when the slider panel is in the retracted position the handhold opening proximate the first side edge of the main panel is exposed for use.

6. The portable window insert of claim 5, wherein the electrical signal receptacle is an electrical receptacle for electricity.

* * * * *